United States Patent
Ekelund et al.

(10) Patent No.: US 9,310,014 B2
(45) Date of Patent: Apr. 12, 2016

(54) SYSTEMS AND METHODS FOR MAKING PIPE, AND METHOD OF INSTALLING THE PIPE IN A PIPELINE

(75) Inventors: Aron Robert Ekelund, Katy, TX (US); Stephen Crockett Catha, Houston, TX (US); Kenneth Ray Charboneau, Slidell, LA (US); Justin Michael Reed, Houston, TX (US); Robert Kyle Bethel, Houston, TX (US)

(73) Assignee: SMART PIPE COMPANY L.P., Houston, TX (US)

( * ) Notice: Subject to any disclaimer, the term of this patent is extended or adjusted under 35 U.S.C. 154(b) by 365 days.

(21) Appl. No.: 13/261,312

(22) PCT Filed: Dec. 7, 2010

(86) PCT No.: PCT/GB2010/052041
§ 371 (c)(1),
(2), (4) Date: Jun. 5, 2012

(87) PCT Pub. No.: WO2011/070353
PCT Pub. Date: Jun. 16, 2011

(65) Prior Publication Data
US 2012/0291903 A1    Nov. 22, 2012

Related U.S. Application Data

(60) Provisional application No. 61/283,651, filed on Dec. 7, 2009.

(51) Int. Cl.
*F16L 55/18*     (2006.01)
*F16L 55/165*    (2006.01)
*B29C 53/80*     (2006.01)
(Continued)

(52) U.S. Cl.
CPC .......... *F16L 55/1657* (2013.01); *B29C 53/805* (2013.01); *B29C 63/10* (2013.01); *F16L 9/16* (2013.01); *G01M 3/002* (2013.01); *B29C 53/66* (2013.01)

(58) Field of Classification Search
USPC ............................................. 138/97, 99, 153
See application file for complete search history.

(56) References Cited

U.S. PATENT DOCUMENTS

| | | | |
|---|---|---|---|
| 1,722,764 A | 7/1929 | Rasch | 442/240 |
| 2,424,315 A | 7/1947 | Hyatt et al. | 138/128 |

(Continued)

FOREIGN PATENT DOCUMENTS

EP    0 231 154    5/1987    .............. B29C 53/62

OTHER PUBLICATIONS

In situ manufacturing: Pipe relining in demanding corrosive environments; High Performance Composites, Jan. 2007, pp. 34-38.

(Continued)

*Primary Examiner* — James Hook
(74) *Attorney, Agent, or Firm* — Guy McClung

(57) ABSTRACT

A method for restoring a degraded pipeline, the method comprising: removing a degraded part of an inner flow pipe of a pipeline leaving a space between two spaced-apart sections of the inner flow pipe; positioning a new pipe in the space; connecting the new pipe to the two spaced-apart sections of the inner flow pipe thereby re-establishing a flow channel through the inner flow pipe; the new pipe having a core pipe with a first strengthening wrap thereon, a second strengthening wrap around the first strengthening wrap, and a protective outer wrap on the second strengthening wrap.

20 Claims, 14 Drawing Sheets

(51) Int. Cl.
*B29C 63/10* (2006.01)
*F16L 9/16* (2006.01)
*G01M 3/00* (2006.01)
*B29C 53/66* (2006.01)

(56) References Cited

U.S. PATENT DOCUMENTS

| | | |
|---|---|---|
| 2,502,638 A | 4/1950 | Becht |
| 2,924,546 A * | 2/1960 | Shaw ........................ 156/94 |
| 3,099,190 A | 7/1963 | Allen, Jr. et al. ............. 93/80 |
| 3,253,618 A | 5/1966 | Cook ......................... 138/125 |
| 3,500,869 A | 3/1970 | Skoggard et al. .......... 138/130 |
| 3,519,520 A * | 7/1970 | Newman, Jr. ......... B29C 33/044 156/173 |
| 3,616,072 A | 10/1971 | Bostrom ..................... 156/468 |
| 3,679,508 A * | 7/1972 | Weidel ....................... 156/173 |
| 3,700,265 A * | 10/1972 | Dufour et al. ................ 285/15 |
| 3,779,308 A | 12/1973 | Buhrmann et al. ........... 165/51 |
| 3,799,825 A | 3/1974 | Champleboux et al. .... 156/144 |
| 3,823,590 A | 7/1974 | Lang ............................ 72/66 |
| 3,826,521 A * | 7/1974 | Wilhelmsen ................. 285/15 |
| 3,905,398 A | 9/1975 | Johansen et al. ............ 138/124 |
| 4,009,063 A | 2/1977 | Wood ........................... 156/71 |
| 4,013,102 A * | 3/1977 | DeLorean et al. .......... 138/144 |
| 4,029,428 A | 6/1977 | Levens ......................... 408/127 |
| 4,049,480 A * | 9/1977 | Kutschke ...................... 156/94 |
| 4,120,324 A | 10/1978 | Pahl .............................. 138/137 |
| 4,123,928 A | 11/1978 | Ferrentino ..................... 72/66 |
| 4,135,958 A | 1/1979 | Wood ........................... 156/199 |
| 4,142,352 A | 3/1979 | Greczin .......................... 57/15 |
| 4,207,130 A | 6/1980 | Barber ...................... 156/244.13 |
| 4,335,752 A * | 6/1982 | Sumner ........................ 138/97 |
| 4,351,349 A | 9/1982 | Minotti ......................... 137/15 |
| 4,366,012 A | 12/1982 | Wood ........................... 156/93 |
| 4,384,595 A | 5/1983 | Washkewicz et al. ....... 138/127 |
| 4,390,574 A | 6/1983 | Wood ........................... 428/36 |
| 4,446,181 A | 5/1984 | Wood ........................... 428/36.1 |
| 4,459,251 A * | 7/1984 | Eldridge ............ B29C 44/1219 138/112 |
| 4,459,883 A | 7/1984 | Astle ............................ 82/4 C |
| 4,478,661 A | 10/1984 | Lewis ........................... 156/92 |
| 4,495,018 A | 1/1985 | Vohrer .......................... 156/187 |
| 4,576,205 A | 3/1986 | Morinaga et al. ............ 138/98 |
| 4,622,196 A | 11/1986 | Wood ........................... 264/229 |
| 4,676,276 A * | 6/1987 | Fawley .......................... 138/172 |
| 4,756,339 A | 7/1988 | Buluschek .................... 138/115 |
| 4,777,984 A | 10/1988 | Storah .......................... 138/98 |
| 4,836,715 A | 6/1989 | Wood ........................... 405/150.1 |
| 4,838,477 A | 6/1989 | Roach et al. ................. 228/222 |
| 4,851,274 A | 7/1989 | D'Elia .......................... 428/113 |
| 4,976,290 A | 12/1990 | Gelin et al. ................... 138/141 |
| 5,010,440 A | 4/1991 | Endo ............................ 361/215 |
| 5,035,539 A | 7/1991 | Kawafuji et al. ............ 405/184.2 |
| 5,049,006 A | 9/1991 | Payne ........................... 405/270 |
| 5,072,622 A | 12/1991 | Roach et al. ................ 73/40.5 R |
| 5,077,107 A | 12/1991 | Kaneda et al. ............... 146/36.1 |
| 5,186,987 A | 2/1993 | Imoto et al. .................. 428/34.5 |
| 5,225,021 A | 7/1993 | Lona ............................ 156/190 |
| 5,271,433 A | 12/1993 | Schwert et al. ............... 138/98 |
| 5,273,611 A * | 12/1993 | Webb ........................... F16L 59/14 156/392 |
| 5,393,103 A * | 2/1995 | Cretzler ......................... 285/31 |
| 5,395,472 A | 3/1995 | Mandich ....................... 145/287 |
| 5,399,854 A | 3/1995 | Dunphy et al. ............ 250/227.17 |
| 5,497,809 A | 3/1996 | Wolf ............................. 138/151 |
| 5,501,248 A | 3/1996 | Kiest, Jr. ....................... 138/98 |
| 5,546,992 A | 8/1996 | Chick et al. ................... 138/98 |
| 5,551,484 A | 9/1996 | Charboneau .................. 138/104 |
| 5,632,952 A | 5/1997 | Mandich ....................... 264/516 |
| 5,634,743 A | 6/1997 | Chandler .................... 405/150.1 |
| 5,680,885 A | 10/1997 | Catallo .......................... 138/98 |
| 5,712,010 A | 1/1998 | Russek et al. ................. 428/36.3 |
| 5,762,450 A | 6/1998 | Schmager ..................... 405/154 |
| 5,865,216 A | 2/1999 | Youngs ......................... 138/135 |
| 5,868,169 A | 2/1999 | Catallo .......................... 138/98 |
| 5,910,168 A * | 6/1999 | Myers et al. ................ 623/1.44 |
| 5,921,285 A | 7/1999 | Quigley et al. ............... 138/125 |
| 5,931,199 A | 8/1999 | Kittson et al. ................. 138/98 |
| 5,933,945 A | 8/1999 | Thomeer et al. .............. 29/825 |
| 6,000,261 A | 12/1999 | Johnston ........................ 72/49 |
| 6,004,639 A | 12/1999 | Quigley et al. ............... 428/36.3 |
| 6,058,978 A | 5/2000 | Paletta et al. .................. 138/98 |
| 6,098,665 A | 8/2000 | Grace ............................ 138/98 |
| 6,123,110 A | 9/2000 | Smith et al. ................... 138/98 |
| 6,170,531 B1 | 1/2001 | Jung et al. ..................... 138/98 |
| 6,199,591 B1 | 3/2001 | Kiest et al. .................... 138/98 |
| 6,220,079 B1 | 4/2001 | Taylor et al. ................... 73/37 |
| 6,276,401 B1 * | 8/2001 | Wilson .......................... 138/172 |
| 6,302,152 B1 | 10/2001 | Mulligan ...................... 138/125 |
| 6,357,485 B2 | 3/2002 | Quigley et al. ............... 138/125 |
| 6,378,549 B1 * | 4/2002 | Zapp ........................ 137/315.01 |
| 6,446,672 B1 | 9/2002 | Kalman et al. ............... 138/127 |
| 6,455,115 B1 | 9/2002 | DeMeyer ...................... 426/36.2 |
| 6,561,229 B2 * | 5/2003 | Wellman et al. ............. 138/146 |
| 6,572,306 B2 | 6/2003 | Prusak ........................ 405/183.5 |
| 6,601,600 B1 | 8/2003 | Taylor ........................ 137/15.04 |
| 6,619,886 B1 | 9/2003 | Harrington ................. 405/184.2 |
| 6,627,281 B2 | 9/2003 | DeMeyer ...................... 428/36.1 |
| 6,634,388 B1 | 10/2003 | Taylor et al. .................. 138/114 |
| 6,663,808 B2 | 12/2003 | DeMeyer .................. 264/171.26 |
| 6,670,880 B1 | 12/2003 | Hall et al. ...................... 336/132 |
| 6,691,741 B2 | 2/2004 | manners ........................ 138/98 |
| 6,708,729 B1 | 3/2004 | Smith ............................ 138/98 |
| 6,758,499 B1 * | 7/2004 | Belew et al. .................. 285/15 |
| 6,759,968 B2 | 7/2004 | Zierolf ........................ 340/854.8 |
| 6,769,454 B2 | 8/2004 | Fraser et al. .................. 138/127 |
| 6,782,932 B1 | 8/2004 | Reynolds, Jr. et al. ........ 156/351 |
| 6,785,004 B2 | 8/2004 | Kersey et al. ................. 356/478 |
| 6,824,689 B2 | 11/2004 | Wang et al. ................... 210/660 |
| 6,945,279 B2 | 9/2005 | Baba et al. .................... 138/137 |
| 6,960,313 B2 | 11/2005 | Waring et al. ............. 264/36.17 |
| 7,025,580 B2 | 4/2006 | Heagy et al. .................. 425/11 |
| 7,165,579 B2 | 1/2007 | Borland et al. ................ 138/99 |
| 7,216,674 B2 | 5/2007 | Manners ........................ 138/98 |
| 7,824,595 B2 | 11/2010 | Appleby et al. .............. 264/316 |
| 7,849,883 B2 | 12/2010 | Manners ........................ 138/98 |
| 8,082,954 B2 | 12/2011 | Rytter ........................... 138/126 |
| 8,146,639 B2 | 4/2012 | Zhang ........................... 156/356 |
| 2002/0124898 A1 | 9/2002 | Renaud et al. ................. 138/98 |
| 2002/0189749 A1 | 12/2002 | Shieh ............................ 156/172 |
| 2003/0051795 A1 | 3/2003 | Burgess ........................ 156/169 |
| 2003/0206989 A1 | 11/2003 | DeMeyer ...................... 425/392 |
| 2004/0025951 A1 | 2/2004 | Baron et al. ................... 138/98 |
| 2004/0144440 A1 | 7/2004 | Lundberg et al. ............. 138/130 |
| 2006/0151656 A1 * | 7/2006 | Gallagher ............ F16L 55/1652 242/437 |
| 2006/0272724 A1 * | 12/2006 | Borland et al. ................ 138/99 |
| 2007/0277923 A1 * | 12/2007 | Wood ..................... B29C 63/06 156/187 |
| 2009/0294567 A1 | 12/2009 | Witmer et al. ................ 242/419 |
| 2010/0154913 A1 * | 6/2010 | Brooks et al. ................. 138/99 |
| 2010/0263761 A1 * | 10/2010 | Niccolls et al. ............... 138/146 |
| 2011/0100498 A1 | 5/2011 | Manners ........................ 138/98 |
| 2012/0186732 A1 * | 7/2012 | Sprague ............. B28B 19/0038 156/188 |
| 2012/0291903 A1 * | 11/2012 | Ekelund et al. ................ 138/97 |

OTHER PUBLICATIONS

Plastic Pipe: Expect Better Materials; Stidger; Gas Utility Manager; Dec. 2003; pp. 38, 39.

Leakage Detection Using Fiber Optics Distributed Temperature Monitoring; Nikles et al; SPIE; Mar. 2004; 8 pp.

Health Monitoring of a Pipeline Based on Distributed Strain and Temperature Measurements; Glistic et al; SMARTEC SA; 2003; 9 pp.

* cited by examiner

SYSTEMS AND METHODS FOR MAKING PIPE, AND METHOD OF INSTALLING THE PIPE IN A PIPELINE

RELATED APPLICATION

This application and the present invention claim priority from and the benefit of the filing date of U.S. Application Ser. No. 61/283,651 filed on Dec. 7, 2009, said application now expired.

BACKGROUND OF THE INVENTION

1. Field of the Invention

The present invention in certain aspects, is directed to non-metallic pipe; to systems and methods for making such pipe; to pipe for installation in a pipeline; to pipelines with such pipe; in certain particular aspects, to continuous reinforced thermoplastic pipe for use as a stand alone pipe within a pipeline to restore a degraded pipeline; and to methods for installing such a pipe in a pipeline.

2. Description of Related Art

Pipeline and/or underground transport of liquids and gases has been utilized for many years. Such pipeline and/or underground transport has proven to be an efficient and safe manner in which to transport potentially explosive, flammable, and/or toxic liquids (e.g. crude oil) and gases (e.g. methane and propane) over long distances. One method for providing such long distance underground transport has been through metal tubes and pipes. In the past, the utilization of metals (such as steel, copper, lead, and the like) was effective from cost and raw material supply perspectives. However, with the population growing throughout the world and the necessity for transporting liquids and gases to more locations increases, the continued utilization of such metal articles has become more and more difficult. Metal pipes and tubes have the potential for internal and external corrosion (which may contaminate the transported liquid or gas), the low threshold of earth-shifting resistance which could cause a break within the pipeline, and the difficulty in replacing worn out metal pipes in sections, again due to the metal pipe weight, metal pipe length, and connection welds.

Although there is a need to produce new pipelines in various locations around the world, there is also a growing need to replace the degrading pipelines already in use.

Known pipe liners have been used in a variety of applications to stop further degradation of a pipeline due to internal corrosion, to provide improved resistance to abrasion, and to stop leakage at joints. Examples of known pipe liners are disclosed in U.S. Pat. Nos. 2,502,638; 4,000,759; 4,384,595; 5,072,622; and 6,305,423; 4,064,211; 4,863,365; 4,985,196; 4,998,871 and 6,058,978; and 6,708,729 (and in prior art cited therein). The use of such pipe liners is well documented in the industry literature and is not applicable to high-pressure applications. Another type of prior art pipe liner is the extruded thermoplastic pipe-liner. A wide variety of pipe, pipe liners, systems and methods are known for lining, manufacture, transport, and installation of continuous non-metallic pipe; including, and not by way of limitation, those disclosed in U.S. Pat. Nos. 7,160,409; 6,889,716; 6,357,485; 6,305,423; 6,286,557; 6,148,866; 6,065,400; 6,058,978; 5,828,003; 5,755,266; 5,072,622; 4,998,871; 4,985,196; 4,863,365; 4,384,595; 4,053,343; 4,000,759; 3,769,127; and 2,502,638. Pending patent applications co-owned with the present invention—U.S. Ser. No. 11/172,132 filed Jul. 1, 2005 and Ser. No. 12/455,582 filed Jun. 3, 2009—are incorporated fully herein for all purposes. U.S. Pat. No. 7,347,127, co-owned with the present invention, discloses, among other things, apparatus for wrapping material on a pipe.

A variety of structures, pipes, liners, and methods are known for repairing a pipeline; including, but not limited to, those disclosed in U.S. Pat. Nos. 7,165,579; 6,478,054; 6,446,670; 6,199,591; 6,117,507; 5,918,639; 5,816,293; 5,360,240; 5,079,824; 5,052,431; 5,035,539; 4,927,182; 4,756,338; 4,639,016; 3,480,043; and 1,051,086 (all incorporated fully herein for all purposes); and in U.S. Statutory Invention Registration H1163 (incorporated fully herein for all purposes).

One well-known pipe liner product and method for rehabilitation of pipelines is flexible yet rigid spoolable composite pipe which can be pulled or otherwise inserted into a host pipe (see, e.g. U.S. Pat. Nos. 3,769,127; 4,053,343, 5,755,266; 5,828,003 and 6,065,540).

Another well-known documented pipe liner product and method for the rehabilitation of pipelines is reinforced thermoplastic pipe which can be inserted or otherwise pulled into a host pipe.

Wound-fiber reinforced plastic pipe is commonly available in a variety of forms, including discrete length products in which a specific length of pipe, e.g. 9.14 m (30-feet), is produced and continuous length products, often referred to as "Spoolable Composite Pipe" or "SCP." One common type of SCP utilizes a polymer liner or core pipe reinforced by layers of wound-fibers in a polymer matrix, e.g. epoxy or polyester, see, e.g. U.S. Pat. Nos. 6,782,932, 5,933,945, 5,921,285, 4,384,595, 4,142,352 and 4,120,324. Another common type of SCP has a polymer liner or core pipe reinforced by wound-tapes or fibers using an orbital process in which material is pulled from bobbins or rolls that orbit a polymer liner as it translates through the apparatus; see, e.g. U.S. Pat. Nos. 2,502,638, 3,616,072 4,259,139 and 4,495,018 and U.S. Patent Application Pub. No. 20040144440, U.S. Ser. No. 351,350 filed Jan. 27, 2003.

SUMMARY OF THE PRESENT INVENTION

The present invention, in at least certain embodiments, discloses pipe for installation within a degraded pipeline, methods to make the pipe, methods to install the pipe in a pipeline, and pipelines with such pipe.

In certain methods according to the present invention stand-alone pipe (or "core pipe") is inserted into damaged or degraded underground pipelines restoring their designed capabilities without excavation and pipe replacement. In one aspect, the present invention discloses methods for making a core pipe suitable for insertion into a host pipe, the methods including: welding together a plurality of pieces to form a pipe (in one aspect, in situ at a site of use), a pipe made of temperature-resistant corrosion-resistant non-metallic material, the pipe having an outer surface, an inner surface, a first end and a second end and a flow channel therethrough from the first end to the second end; wrapping the pipe with a first strengthening wrap; wrapping the pipe with a second strengthening wrap; and wrapping the pipe with a protective outer wrap to protect the pipe during installation in a host pipe. In one aspect, the wrap is a fabric of high strength synthetic fibers (in one aspect, unidirectional fibers). In one aspect, a wrap is connected to a pipe or to a previously-installed wrap layer by taping an end of a wrap to a pipe (or to a wrap layer) with any suitable tape.

In one aspect, the present invention discloses pipe which is non-metallic and which is suitable for insertion into a host pipe, the pipe including: a pipe made of temperature-resistant corrosion-resistant material, the pipe having an outer surface, an inner surface, a first end and a second end and a flow channel therethrough from the first end to the second end; a first strengthening wrap around the pipe; a second strengthening wrap around the pipe; and a protective outer wrap on the pipe for protection installation and/or during insertion into the host pipe.

In certain aspects, the present invention discloses a stand-alone reinforced thermoplastic pipe of continuous length with: a layer of polymeric material; two or more layers of fabric reinforcement material; orbitally wound tapes and/or fibers to lock material and/or tapes in relationship to fabric reinforcement; optionally, one or a series of fiber optic cables; and, optionally such cables covered by a protective layer, e.g. a protective polymer layer.

In one aspect, a wrap layer is wrapped onto a pipe or onto an already-applied wrap layer using a gantry wrap system according to the present invention. In one aspect, wrapping is done first as the gantry wrap system moves forward over a pipe. Optionally, when the gantry wrap system reaches a first end of the pipe, the system is reoriented, wrap is connected to the wrap layer on the pipe (e.g. with duct tape), and the gantry wrap system moves in an opposite direction toward a second end of the pipe wrapping another layer onto the already-applied layer; or the gantry wrap system is moved back to the initial starting point at the second end of the pipe and another wrap layer is applied.

Pipe in accordance with certain embodiments of the present invention is stand-alone pipe which is capable of withstanding typical pipeline operating and installation loadings and, optionally, with embedded measurement and/or redundant sensing devices for monitoring the integrity of a restored pipeline on a continuous basis.

The present invention discloses, in at least certain aspects, a light-weight high-strength multi-component pipe that can be installed as a stand-alone pipe restoring a host pipeline to (or near) its original performance parameters and original service life, while providing increased internal and external corrosion protection and increased protection from damage, e.g. during earthquakes, accidents, and acts of terrorism. In certain aspects, a "stand-alone" pipe as used herein is a pipe that withstands all (or substantially all) installation and operational loads without assistance.

In certain aspects, the present invention discloses a stand-alone reinforced thermoplastic pipe of continuous length with: a layer of polymeric material; two or more layers of fabric reinforcement material; optionally, an axial strengthener [e.g. axial tapes (in one aspect, fiber tapes) or socks, or flattened tubes, e.g., in certain aspects, made from carbon fiber based material, or any suitable high strength fiber or material disclosed herein] for increasing strength; orbitally wound fibers to lock the tapes in relationship to the fabric reinforcement; optionally, one or a series of fiber optic cables; and, optionally such cables covered by a protective layer, e.g. a protective polymer layer, which, in certain aspects mitigates installation damage and provides structure for collecting and removing permeated fluids.

In certain aspects a pipe according to the present invention is designed for long term service (fifty years or more) at maximum allowable operating pressures up to $1.37 \times 10^7$ Pa (~2,000 psi, 136 bar) with safety factors in the range from 2.8 to 3.8 against Short Term Burst. In certain aspects, wrap materials of synthetic fiber are used as a unidirectional fabric wrapped at about plus and minus 65-degrees for hoop strength (internal pressure resistance) and, optionally, axial tapes of the same description (to take axial loads from hydrostatic testing or pulling a long line into place) are used.

Optionally, the wrap(s) and/or the axial tapes are coated on at least one side with a thermoplastic hot melt, such as EVA or HDPE.

In one particular aspect a first layer of a pipe according to the present invention is a first polymeric layer which is an extruded cylindrical thermoplastic or modified thermosetting resin material, such as polyolefin, polyamides, polyvinyl chlorides and alloys thereof, HDPE and polymeric materials that have sufficient resistance to chemical attack and strength to be used in applications involving the transport of hydrocarbons and water. Such materials are readily available worldwide and have had extensive usage in the transportation of natural gas, hydrocarbons and water. An extruded cylinder is produced in long, yet transportable, lengths for ease of inspection and transport to the fabrication site. These discrete length cylinders of polymeric material are welded together, e.g. butt fusion welded, to form a continuous-length inner pressure barrier for the pipe. The weld is accomplished using existing technology in conjunction with, preferably, rapid cooling techniques, to increase the process speed. Both the external and internal weld beads are, optionally, removed during the process and each weld is subjected to a 100% volumetric non-destructive integrity test.

Reinforcement added to the first layer cylinder of the pipe is one layer, at least one layer, two or at least two layers of fabric (preferably, but not necessarily, unidirectional fabric) applied under tension (e.g. tension provided by rotating a core pipe beneath a fabric wrapping apparatus according to the present invention) and, in one aspect, at essentially equal but opposite angles (that is, plus and minus the same angle, with respect to the pipe liner axis). In certain aspects, each layer of reinforcement of the pipe is a single width of fabric. Each width of fabric can have several individual thicknesses of reinforcement material.

In certain aspects the material used is one of several advanced reinforcement fiber materials commonly referred to as "ballistic materials" or "extended chain polyethylene ballistic material". This material is light weight, exhibits high specific strength, high specific stiffness and low elongation or stretch.

For certain aspects of the present invention, the desired coverage is 100 percent and the nominal value of a fabric winding angle ranges between 50 and 60 degrees or between 35 and 70 degrees, e.g., in one aspect, about 55 degrees, e.g. 54.7 degrees. The outside diameter of the pipe increases with each reinforcement layer resulting in a required increase in the fabric width for each layer. For certain aspects of the present invention, the angle $\phi$ may be adjusted slightly to produce 100 percent coverage using a single fabric width. In one aspect a thin polyolefin layer (e.g. a layer 10 as described below) resists pressure until the reinforcement becomes loaded and the further increase in pressure is transferred to the reinforcement. This transfer in loading appears to take place at approximately one third of the maximum allowable operating pressure.

The materials of construction may have extremely low coefficients of friction and the first reinforcement layer may, optionally, be locally bonded to the inner liner and the reinforcement layer(s) are bonded to each other, e.g. using any suitable adhesive, e.g. a glue or rapidly curing adhesive and/or tape. Bonding takes place at one, two, three, four or more independent narrow axial strips (or intermittent amounts of glue or adhesive) equally spaced on the circumference of the substrate. In certain aspects, the total width of the axial strips makes up no more than 10% of the circumference of the inner pipe (first layer cylinder). The limited bonding is used to maintain the flexibility of the pipe-liner while holding the reinforcements in place during subsequent manufacturing operations.

Optionally, components of a continuous measuring, monitoring and communications systems are bonded to the pipe surface. This system is intended, in certain aspects, to allow monitoring on a continuous or intermittent basis as determined by the pipeline operator. The system is a fiber optics system.

In addition to the monitoring system, additional fiber optic cables can be provided for use in a communications and control system. These fiber optic cables can be included within the tapes mentioned or within separate tap The monitoring system package and reinforcement is, optionally, protected by a polymeric cover or jacket. This placement can result in an annular space between the pipe reinforcement and the inside of the cover sheet due to the presence therebetween of the fiber optic sensors. Spacers are, optionally, placed between the sensor tapes as necessary to support the cover (e.g., separate spacers made of plastic, wood, extruded thermoplastic or thermosetting material or spacers that are integral to a cover). Additionally, in certain aspects, these spacers are, optionally, shaped to permit the accumulation of permeated fluids from the flowing fluid to be vacuumed at an external vent port so there is no accumulation of pressure that might result in damage to the pipe liner. Monitoring the amount of fluid removed and/or pressure relieved provides an additional indication of the integrity of the pipe liner.

BRIEF DESCRIPTION OF THE DRAWINGS

For a better understanding of the present invention, reference will now be made, by way of example only, to the accompanying drawings in which.

DETAILED DESCRIPTION OF THE PREFERRED EMBODIMENTS

Figure 1:
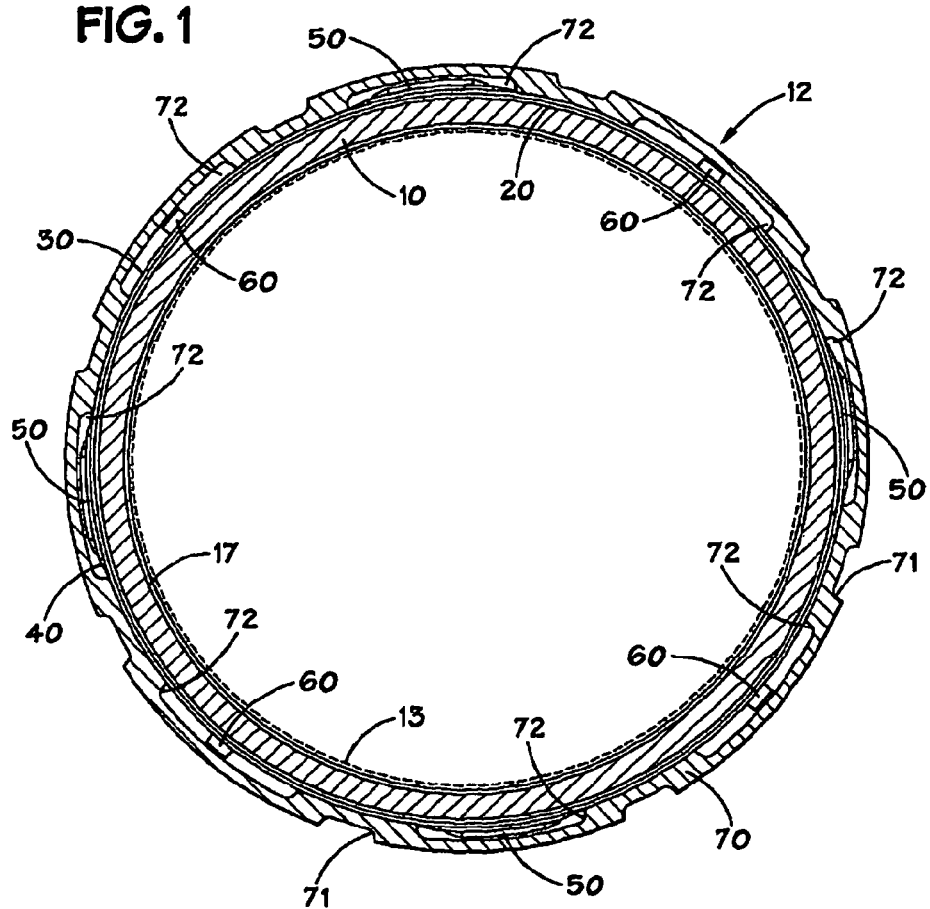
FIG. 1 is a cross-section view of a liner according to the present invention.

A pipe liner 12 (or "pipe") according to the present invention as shown in FIG. 1 has an innermost first layer (which when formed is a hollow cylinder, in one aspect, a deformable/re-formable cylinder), a second layer 20, a third layer 30, fiber strands 40, spacers 50, fiber optic cables 60, and a cover 70.

Figure 2:
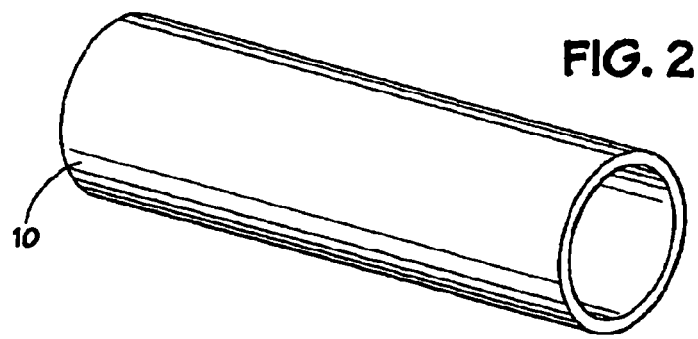
FIG. 2 is a side view of components of the liner of FIG. 1.

As shown in FIGS. 1 and 2, the first layer 10 is a generally cylindrical member made of flexible material sufficiently strong to support the other layers and components and sufficiently flexible to be compressed, deformed, and re-formed. In one particular aspect the first layer 10 is extruded HDPE (e.g. any suitable grade; e.g. PE 3408, PE 100), with an outside-diameter-to wall-thickness ratio SDR of about 32.5 in hollow cylindrical form. In certain aspects the lined pipe is between 0.1 m and 0.76 m (4" and 30") in O.D. and, in other aspects, the pipe that is lined is standard size (iron pipe size or IPS) and has an O.D. between 0.15 m and 0.41 m (6" and 16"). In one particular aspect, 15.24 m (fifty foot) lengths of such first layers are commercially available. In certain aspects a fluid-resistant thermoplastic material is used for the first layer that resists fluids being transported through a pipeline or pipe. NYLON 6 (Trademark) material, RILSAN (Trademark) material, or NYLON 11 (Trademark) material or other suitable thermoplastic material may be used for the first layer.

Pipe according to the present invention made by methods according to the present. invention, in certain aspects, has an outer diameter ranging between 0.025 m and 3.05 m (one inch and one hundred twenty inches).

In certain embodiments, lengths of the first layer 10 are welded together on-site at a location at which the liner 12 is to be installed within a pipe or pipeline. In one aspect the lengths of the first layer 10 are butt fusion welded and while the welds are still hot weld beads are smoothed out and/or removed both inside and outside the layer 10. Optionally, the welded area is tested on-site for integrity, e.g., but not limited to, with known ultrasonic testing apparatus.

Figure 3:
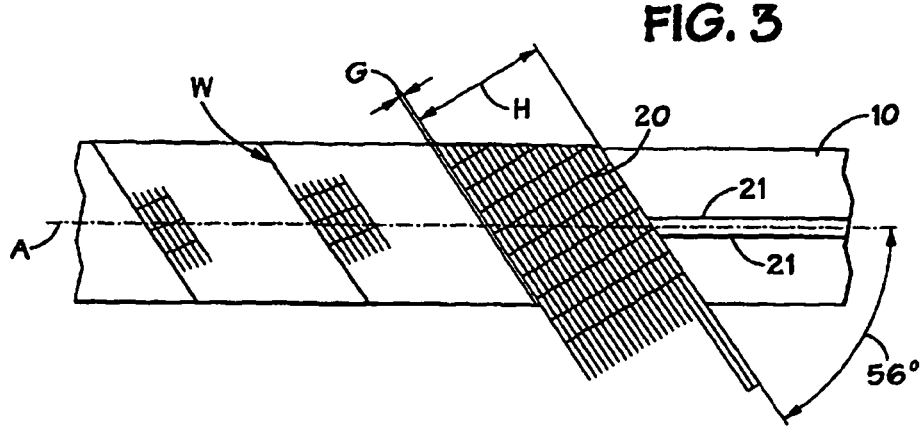
FIG. 3 is a side view of components of the liner of FIG. 1.

As shown in FIGS. 1 and 3, the first layer 10 is wrapped with the second layer 20 which is a layer of material for strengthening the liner 12. Suitable materials for the second layer 20 include fabric with highly oriented HMPE fibers ("HMPE": high molecular weight polyethylene); SPECTRA (Trademark) material; KEVLAR (Trademark) material; ARAMID (Trademark) material; VECTRAN (Trademark) material; liquid crystal polymer ("LCP") material; DYNEEMA (Trademark) material; TWARON (Trademark) material; TECHNORA (Trademark) material; fiber-reinforcing material, e.g. carbon fibers, fiberglass fibers and/or hybrid fibers; fabric made from carbon fibers and/or glass fibers; and fabric made from carbon fibers and SPECTRA (Trademark) fibers. In certain particular aspects, SPECTRA (Trademark) material, commercially available from Honeywell Company is used because it has a weight-to-volume ratio of 0.035 lbs/in3. In certain particular aspects, commercially available para-aramid material is used which has a weight-to-volume ratio of 0.051 lbs/in3. In certain particular aspects, commercially available carbon-fiber reinforced material is used which has a weight-to-volume ratio of 0.051 lbs/in3. The thickness of layers 20 and 30, in certain aspects, ranges between 0.25 mm and 6.10 mm (0.010" and 0.240") and in one particular aspect is 0.61 mm (0.024 inches). In one aspect the layer 20 and/or the layer 30 are highly oriented high molecular weight polyethylene ("HMWPE").

The second layer 20 is wrapped around the first layer 10, in certain aspects at a wrap angle (or wind angle) between 45 degrees and 70 degrees. In other aspects this wrap angle is between 50 degrees and 60 degrees and, in one particular aspect, this angle is 54.7 degrees. As shown in FIG. 3, the wind angle is designated "plus" to indicate its orientation with respect to a longitudinal axis A of the layer 10 and the wind angle is 56 degrees. Edges of each wrap are butted up against edges of adjacent wraps so no part of the second layer overlaps itself (see, e.g. butting up indicated by arrow W, FIG. 3). Alternatively, a minimal overlap is used; or there is a gap G as shown in FIG. 3. Each wrap of the layer 20 has a width H). Optionally, one, two, three, four, five, six, seven, eight or more tapes, strips, or lines of adhesive or glue 21 are applied on the liner 10. It is to be understood that the entire layer 20 can, according to the present invention, be wrapped around the layer 10 with no gap between wrap edges; with an overlap of some edges; with a gap between all adjacent wrap edges; or with a combination of gap between some edges, overlap of some edges, and/or no gap between others. In certain aspects in which the layer 20 (and/or the layer 30 discussed below) have unidirectional (oriented at the same angle or in the same direction) fibers, the layer 20 is applied so that the fibers are oriented generally at an angle to the longitudinal axis A, in one aspect, at the same angle as the wind angle. By employing no such overlap, overall effective diameter of the liner 12 is reduced. Alternatively, the second layer 20 is wrapped with space between adjacent wrap edges, rather than butting edges against each other which also results in no overlap. In some such aspects, space between adjacent wrap edges is no more than 3% of the total liner surface area.

Figure 6:
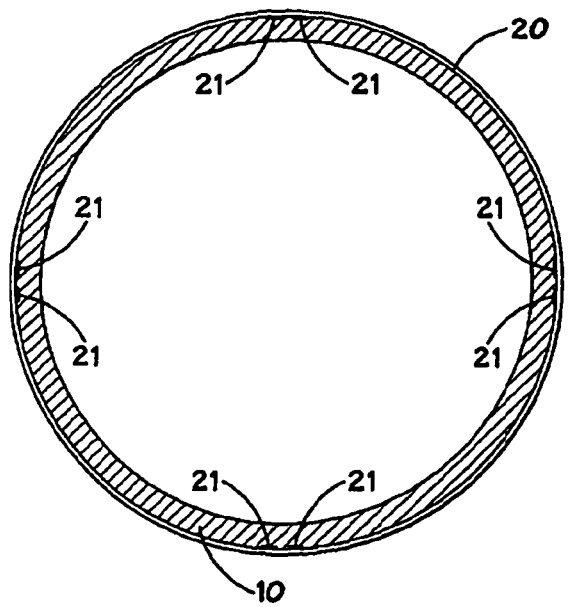
FIG. 6 is a cross-section view of components of a liner as in FIG. 5.

Optionally, as shown in FIGS. 3 and 6, one or more lines or strips of glue, adhesive, or tape 21 may be applied to the first layer 10, either intermittently or from one end of the first layer 10 to the other, either in straight lines (as shown) or wrapped around the first layer 10, to inhibit or prevent slippage of the second layer 20 on the first layer 10. In an embodiment in which SPECTRA (Trademark) fiber material is used with axial carbon fibers, these lines 21 tie the axial carbon fibers to the SPECTRA (Trademark) fibers so the two function at the same strain rate which allows the carbon fibers to strengthen the fabric. In certain aspects a commercially available modified cyanoacrylate type of glue is used, from Loctite Company for the lines 21. As shown in FIG. 6, eight lines 21 are used; but any desired number (e.g. 1, 2, 3, 5, 10, etc.) may be used. In one aspect the lines 21 are sprayed on. In certain aspects the lines 21 (and 31) are applied so that the liner 12 is still sufficiently flexible that it can be deformed and re-formed as desired. In one aspect two, three, four, five or more pairs of two lines are used spaced apart around the circumference.

Figure 4:
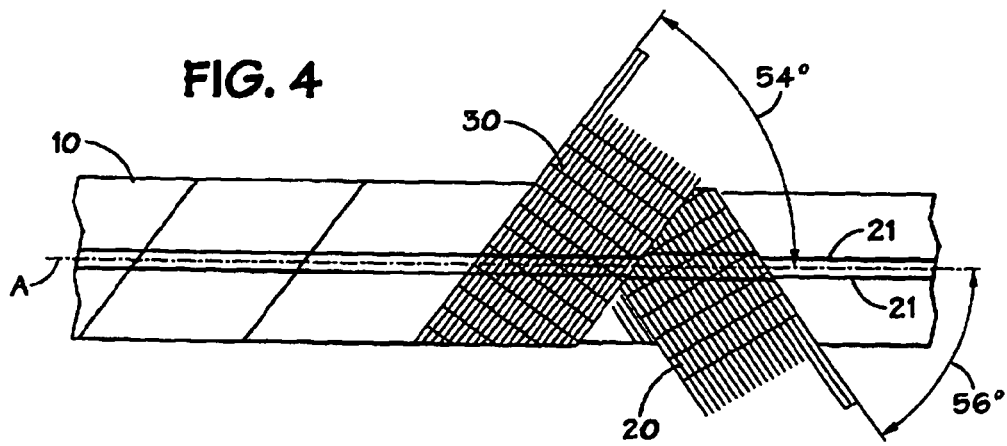
FIG. 4 is a side view of components of the liner of FIG. 1.
Figure 7A:
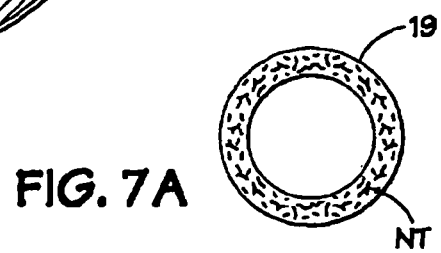
FIG. 7A is a crosssection view of a linear layer according to the present invention.
Figure 7:
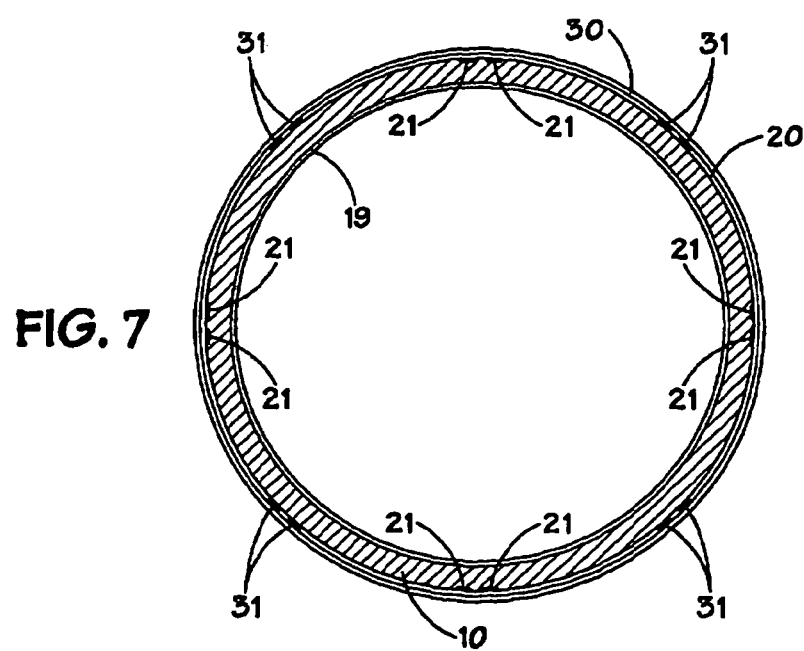
FIG. 7 is a cross-section view of components of a liner as in FIG. 5.

As shown in FIGS. 1, 4 and 7 the third layer 30 is wrapped over the second layer 20 and may be wrapped in any of the ways described for the second layer 20 and may be material as described for the second layer 20, with or without lines, etc. 21 on the layer 20 as described for the layer 10. In one aspect both the second layer 20 and the third layer 30 are SPECTRA (Trademark) material about 0.024 inches thick. In certain aspects the third layer 30, as shown in FIG. 4, is wrapped at a wrap angle opposite to that of the second layer 20 (designated "minus" to illustrate its orientation with respect to the axis A and in a direction opposite to that of the layer 20; and, as shown at a wind or wrap angle of minus 54 degrees). Also, as shown in FIG. 7 (not to scale) in an end view, lines 31 (like the lines 21) may be used between the second layer 20 and the third layer 30.

Figure 5:
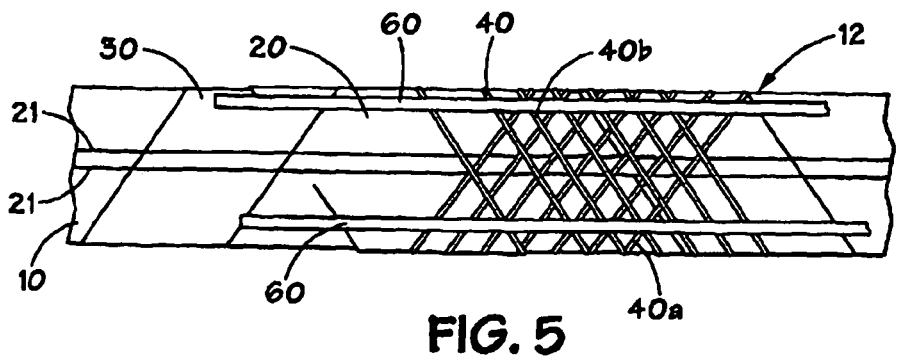
FIG. 5 is a side view of components of the liner of FIG. 1.
Figure 8:
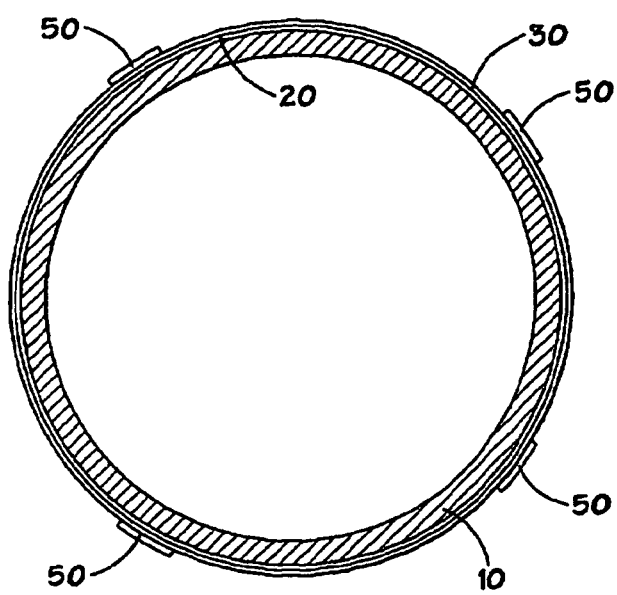
FIG. 8 is a cross-section view of components of a liner as in FIG. 5.

Optionally, as shown in FIGS. 1, 5 and 8 one, two, three, four, five twenty, thirty, thirty six, forty or more fiber strands (or "tows") 40 are used, e.g. wound on the third layer 30 (and/or on the layer 20 and/or on the tapes 50) to strengthen the liner 12 and/or to facilitate its integrity while it is being pulled into a pipeline. Any suitable fiber may be used. It is within the scope of the present invention to apply strands or tows 40 at different wind angles on a liner 12. Strands 40a are at a plus wind angle and strands 40b are at a negative wind angle.

In certain particular aspects the strands 40 are commercially available fiber tows, which are wound on the liner 12. With the fibers 40 glued or otherwise adhered in place, the fibers 40 and the remaining components form a single integral body which can react to and withstand strain so that creep (undesired movement) of the third layer 30 is reduced and axial loads on the liner 12 are partially absorbed by the tapes 50 thereby reducing strain on the other layers.

Figure 9:
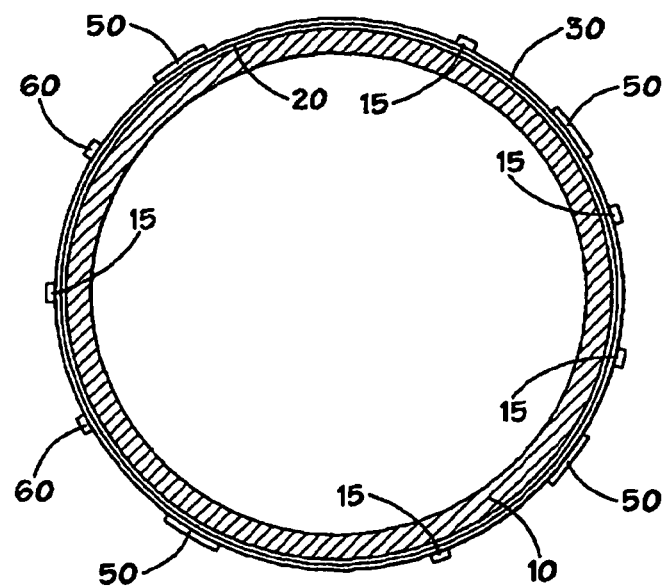
FIG. 9 is a cross-section view of components of a liner as in FIG. 5.

Optionally, as shown in FIGS. 1, 5 and 8, tapes 50 (or socks or tubes) (or stacks of two, three or more tapes 50) may be applied to the third layer 30. Optionally, one or some strands 40 are applied over the layer 20, over the layer 30, and/or over the tapes 50. The strands 40 when used over the tapes 50 tie the tapes 50 to the lower layers. In one particular aspect a first tape or first tapes 50 are applied on the layer 30 then a layer of strands 40 (described below) ties the tapes 50 in place. Then one or more additional tapes 50 is applied over the strands 40 and additional (one or more) strands 40 tie the additional tapes 50 in place. These tapes 50 also enhance the ability of the liner 12 to be pulled into a pipeline. In one particular aspect the tape 50 is carbon fiber tape, about 1.50 inches wide, about 0.040 inches thick, and eight such tapes 50 are used equally spaced around the circumference of the liner and extending in straight lines from one end thereof to the other (or 4 pairs of 2 tapes stacked one on the other are used). The tapes 50 (and the fibers 40) can be equally spaced around the liner circumference or not; e.g. FIGS. 8 and 9 show a cross-section view with particular spacing for the tapes 50. The spacing for the tapes 50 as shown in FIG. 9 facilitates the maintenance of a folded liner 12 (insertable into a pipe or pipe line) in a general "C" shape as described below (see FIG. 14).

Figure 10:
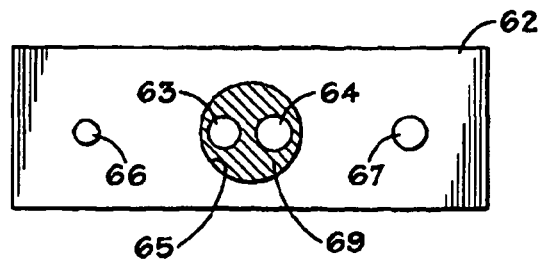
FIG. 10 is a cross-section view of a prior art fiber optic cable.

As shown in FIGS. 1 and 9, fiber optic cables 60 (one, two, three, four, five, six, or more) are applied on the fibers 40. It is within the scope of the present invention to apply the fiber optic cable(s) to the layers 10, 20, and/or 30 and/or on the tapes 50 and/or beneath a cover like the cover 70. Any known suitable fiber optic cables may be used, including SmartProfile (Trademark) cables from Smartec S/A Company. In one particular aspect a SmartProfile (Trademark) fiber optic cable 61 is used as shown in FIG. 10 which has a body 62, e.g. made of HDPE which encases two fiber optic cables 63, 64 in filler material 69 within a central space 65 and two additional fiber optic cables 66, 67. Either or both of the cables 63, 64 is used to measure temperature on the liner 12 and either or both of the cables 66, 67 are used to measure strain. The temperature measurements provide information regarding leaks in the liner 12 both regarding the existence of a leak and its location (temperature and strain measurements are done in prior art systems with cables on the outside of a pipe, e.g. a steel pipe). Either cable 63 or 64 may be deleted; but providing two such cables provides redundancy in the event one of them fails.

Figure 11A:
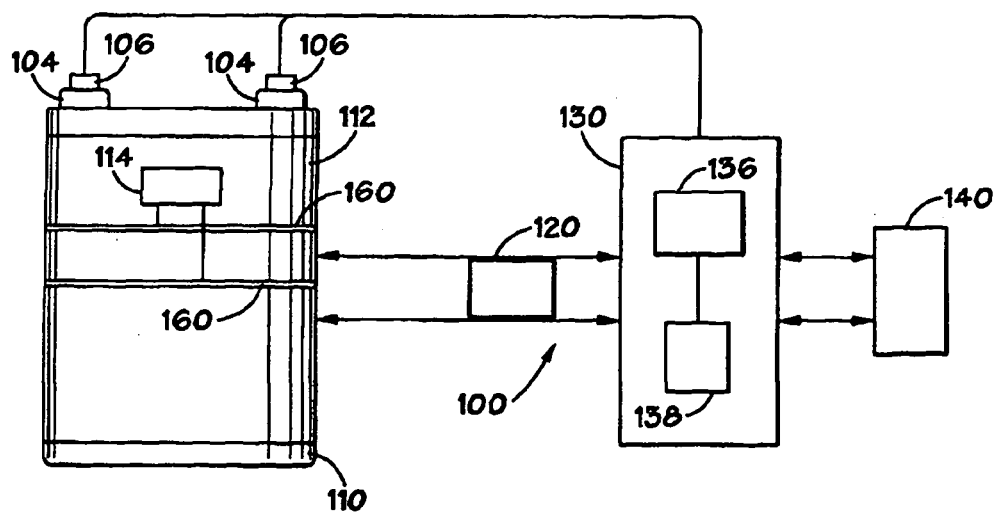
FIG. 11A is a schematic drawing of systems used with liners according to the present invention.

FIG. 11A shows schematically a system 100 according to the present invention for receiving, processing, and transmitting information based on the signals from fiber optic cables. A pipeline (or pipe) 110 has a liner 112 (or "pipe") (like the liner 12 described above or like any liner according to the present invention) with a fiber optic system 114 as described above with fiber optic cables 160 (like the cables 60 described above). The pipeline 110 has a variety of pipeline-associated devices and apparatuses 104 (two shown schematically), each with an operator or controller 106. In one particular aspect, the pipeline 110 has a plurality of apparatuses 104 which are valves that selectively control the flow of fluid through the pipeline and each valve has a controller 106 which is in operational communication with the fiber optic system 114. A measurement system 120 provides a communications interface between the pipeline 110 and a control system 130 (e.g. a pipeline operator's control room with a SCADA system 136). The SCADA system 136 includes a computer system 138 which receives digitized signals from the system 120 which has converted the analog signals from the pipeline 110 into digital form) indicative of temperature and/or strain along the length of the pipeline 110. Either the system 120 or the system 138 has a programmable medium programmed to note an anomaly or spike in either temperature or strain or both. Such an anomaly or spike can indicate a potential leak (temperature spike) or a potential overstress condition or impending liner failure (strain spike) in the pipeline 110. In one aspect the system 130 activates an alarm or alarm system 140 when an alarm value for temperature, strain or both is reached. In one particular aspect, each of the apparatuses 104 is a pipeline valve; an alarm is provided by the system 140 in response to signals from the system 114 (temperature or strain or both measured and indicating a leak at a location between the valves 104), 120, 130; controllers 106 on each valve 104 are activated to close both valves 104; and both valves 104 are closed, isolating the length of the pipeline 110 between the valves.

Figure 11B:
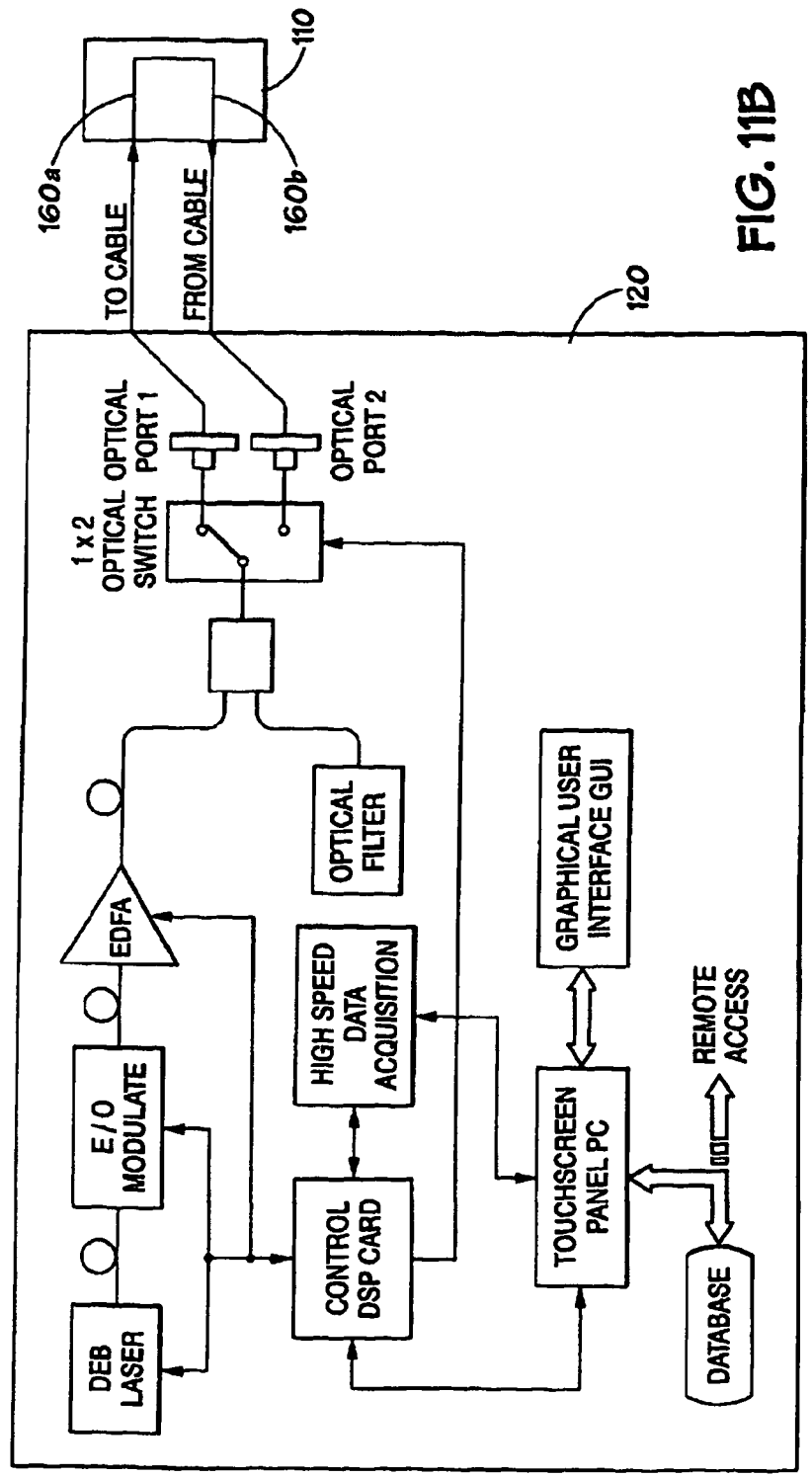
FIG. 11B is a schematic drawing of systems used with liners according to the present invention.

FIG. 11B illustrates schematically one particular embodiment of a system 120 (e.g. a commercially available Model DiTest Model STA 201 from Smartec S/A company) connected to a pipeline 110. Fiber optic cables 160a, 160b are looped as shown or terminated with a reflective end (as may be done with any cable of any system herein). In one aspect, instead of looping the cable, a mirror is provided at the end of the cables 160a. 160b for beam bounce back in the same cable. As shown in FIG. 11B, the prior art measurement system 120 is, according to the present invention, used with the pipeline 110. The measurement system 120 sends a signal (e.g. a laser beam) to and through the upper (as shown in FIG. 11B) fiber optic cable 160a and receives a signal back through the lower (as shown in FIG. 11B) fiber optic cable 160b. The system 120 inputs signals into the fiber optic cables; monitors the return signals; processes the return signals (including A/D conversion); produces digital signals indicative of measured parameters (temperature and/or strain of the pipeline 110) e.g. temperature sensitivity within 4° F. and/or strain sensitivity within 0.002%.

It is old and well-known to use grooves or recesses 71 in a cover 70 as shown in FIG. 1 (see, e.g. U.S. Pat. No. 6,220, 079). Optionally, a cover 70 according to the present invention as shown in FIG. 1 may have one, two, three, four, five, six, seven, eight or more interior grooves or recesses 72. Such grooves or recesses are used within a pipeline lined with a pipe liner 12 to provide a space to hold gases from the fluid flowing through the pipeline which permeate through layers of the liner 12.

Figure 12:
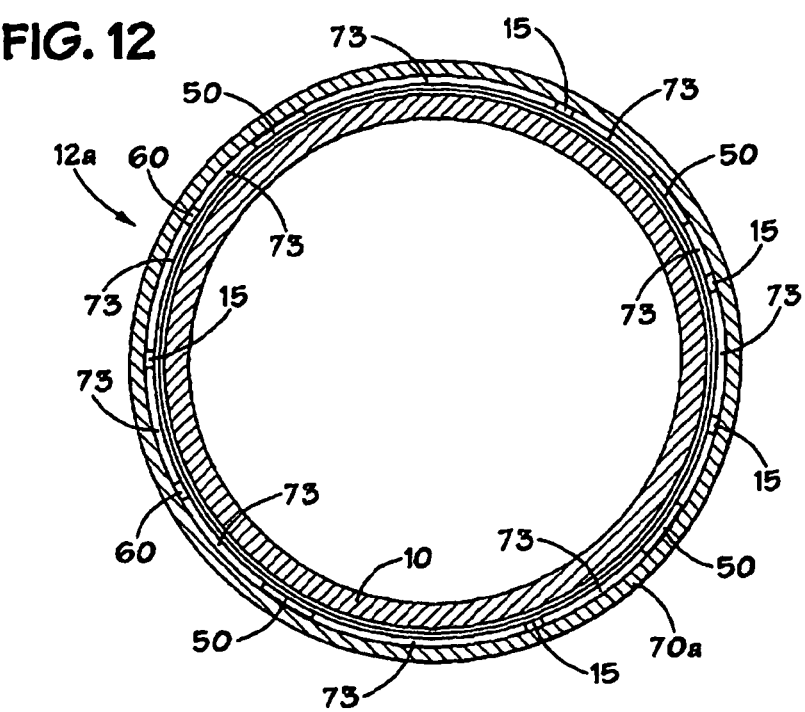
FIG. 12 is a cross-section view of a pipe according to the present invention.

Optionally, a cover 70 is provided with no grooves 71 and with no grooves 72. As shown in FIG. 12 a pipe liner 12a (like the pipe liner 12) has one, two, three, four, five, six, seven, eight or more spacers 15 (two shown) over which is applied a cover 70a. The cover 70a has no grooves, interior or exterior, and spaces 73 formed adjacent the spacers 15 provide a volume that can be entered to vent accumulated gases. Alternatively, one or more grooves like the grooves 72 and/or like the grooves 71 may be used with the liner 12a.

When gases permeate a liner 10 and enter into grooves 71, grooves 72 and/or spaces 73, this accumulated gas is removed from the spaces adjacent the grooves or from the spaces 73, e.g. by vacuuming from ports provided along a pipe or pipe line. Such gas permeation is reduced by co-extruding with the first layer 10 a thin layer 17 (shown partially, FIG. 1; encompasses entire length and circumference of the pipe or pipeline) of impermeable material (e.g. 1.5 mm, 0.060 inches thick) which is on the wetted side (an interior side) of the first layer 10 and serves as a pressure barrier. In one aspect this layer 17 is EVOH (ethylene vinyl alcohol copolymer) or NYLON (Trademark) material. In another aspect, to reduce gas permeation, a thin layer 19 (see FIG. 7; e.g. 1.5 mm, 0.060 inches thick) of HDPE is co-extruded with the first layer 10. The layer 19 has a plurality of functionalized single wall nano tubes throughout the layer 19 which both inhibit gas permeation through the first layer 10 and which strengthen it. In one aspect, by volume, between about 1% to 5% of a layer is made of these nano tubes; and in one particular aspect about 2%.

In certain materials and certain ballistic materials, e.g. the SPECTRA (Trademark) material creeps (i.e., elongates under loading) which can result in a loss of strength of an overall layer. To strengthen such layers and to reduce creep therein, a plurality of functionalized single wall nano tubes is added to the second layer 20 and/or to the third layer 30 (and/or to any other layer or component). Using functionalized nano tubes from NanoRidge Materials, Inc. results in substantially no increase in weight of a layer or of a component, e.g. of a layer 20 or a layer 30 due to their small size. In certain aspects, by volume these nano tubes are about 1% to 5% of a component or of a layer's total volume and, in one particular aspect, are about 2% of this total volume.

In certain aspects for the layers 10, 20, 30 a mixture of fibers can be used instead of using, e.g. only SPECTRA (Trademark) material fibers. For example, carbon fibers (20% to 50% by volume) can be mixed with SPECTRA (Trademark).

Figure 13:
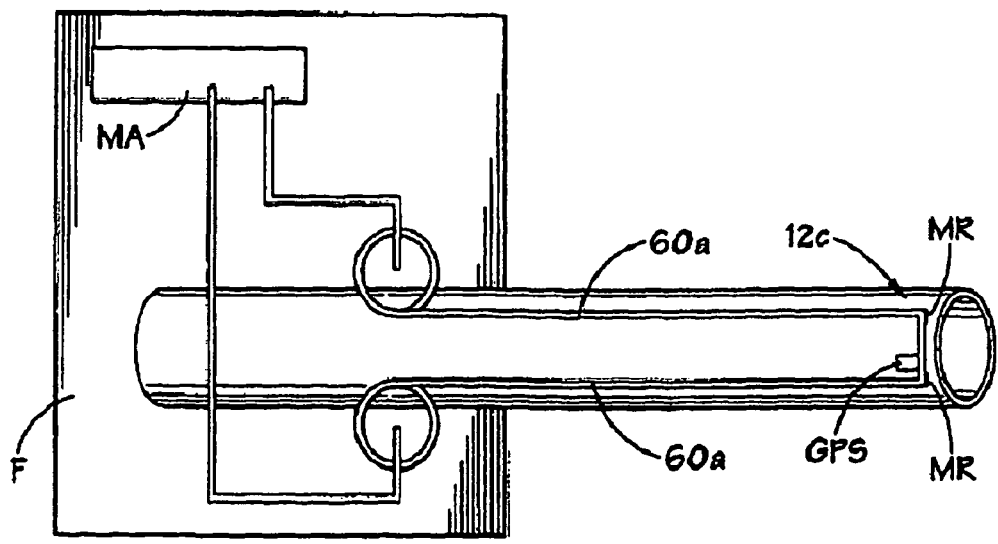
FIG. 13 is a schematic view of a method for producing a liner according to the present invention.

FIG. 13 illustrates schematically a method according to the present invention for producing a pipe 12c (any pipe according to the present invention) which has fiber optic cables 60a (like the fiber optic cables 60 or any fiber optic cables described above) which are applied to the pipe 12c as the pipe 12c is being made to monitor installation effects, e.g. location in a host pipe and/or applied tension. As the pipe 12c exits a liner making machine in a production system F, a system MA (e.g. like the system 120 described above) is in communication with the fiber optic cables (as the system 120 is in such communication as described above). By employing mirrors MR at the distal end of the fiber optic cables and/or by using a GPS sensor apparatus GPS (which emits a GPS locator signal transmitted through the fiber optic cables) at the end of the pipe 12c, the system MA can determine the distance from the end of the pipe 12c at the machine exit to the distal end of the produced pipe, thereby providing a measurement of the length of the produced liner 12c. Strain, if there is any on the pipe 12c as it is produced is measured providing a measure of the pulling force. Similarly, using a system MA during a pipe installation procedure, a measurement is provided which indicates the length of pipe installed within a pipe or pipe line; and, in one aspect, a measurement of a strain on a pipe as it is pulled into a pipe or pipe line. Any pipe or pipeline herein may have a fiber optic cable or cables with a mirror MR and/or a GPS apparatus as described above.

Figure 14:
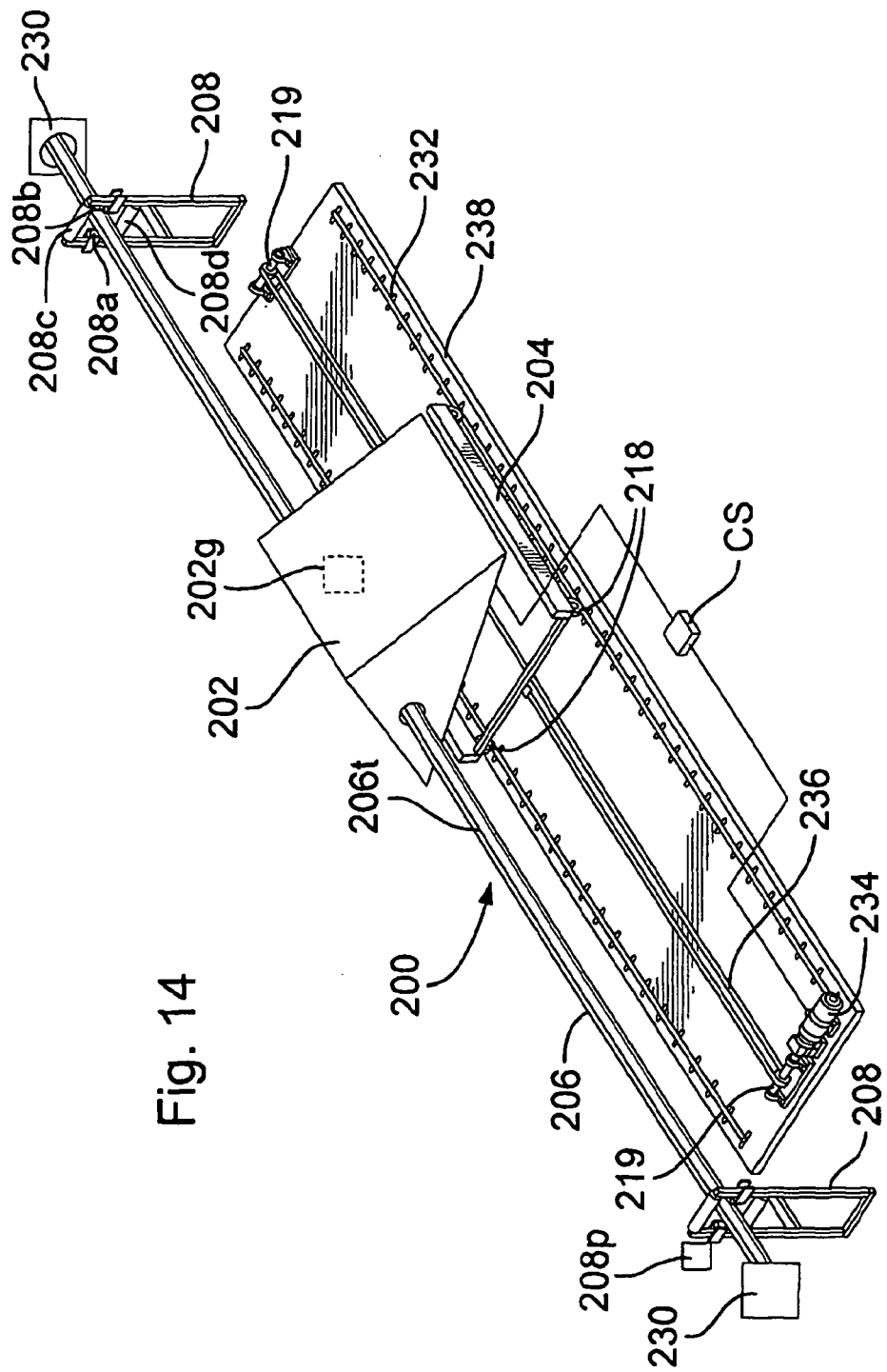
FIG. 14 is a perspective view of a system according to the present invention.

FIG. 14 illustrates one embodiment of a system 200 according to the present invention with a wrapping apparatus 202 according to the present invention (shown schematically) mounted on and supported by a movable base 204.

Pipe supports 208 with a plurality of rollers 208a, b, c, d support a core pipe 206 as the wrapping apparatus 202 is moved along the pipe 206. The movable base 204 has rotatable rollers 218 for movement on tracks 232 on a support 238. A motor 234 moves a chain or belt 236 around rods 219 which is attached to the base 204 to move the base 204. Rotators 230 rotate the pipe 206 for wrapping. Only one rotator may be used. The motor 234 is activated and controlled by a control system CS which may also control the wrapping apparatus 202. Optionally, a power system 208p (shown schematically, FIG. 14) powers the rollers that support the pipe for selective powered rotation of the pipe. Such a power system may be used with any pipe-supporting roller herein. Optionally, a pipe in a system according to the present invention has a guide line thereon (e.g. see line 206t on the pipe 206) and an optional laser guidance system 202g tracks and follows this line.

FIG. 15 and FIGS. 16A-16d show a system 250 according to the present invention for making a pipe for installation in a degraded pipeline. The pipe may be any pipe disclosed herein or any pipe according to the present invention (including, but not limited to a pipe as in FIGS. 1, 2, 3-9, 12 and 20).

The system 250 has pipe rotators 252 which rotate a core pipe 210 (e.g., but not limited to, a piece or section of HDPE pipe or pieces of HDPE pipe welded together). Pipe supports 254 (which may have rollers, not shown; e.g. like rollers 208a-c or rollers 294) support the pipe 210. The pipe 210 extends through and is rotated beneath a gantry system 260 according to the present invention which includes wrapping apparatus 280 for wrapping material (fabric, tapes, etc.) onto the pipe 210. In one aspect, a wrap layer is applied during forward motion (left-to-right, FIG. 15) of the system 260. Then the motion of the system 260 is reversed (right-to-left, FIG. 15) and another layer is applied; or the system 260 is moved back to an initial starting point and another layer is again applied in a forward motion. Any second or additional layer (of wrap or of tape) can be applied at an angle the same as, or an angle different from, the application of a previously-applied layer (or tape). In one particular aspect, the winding angle of an additional layer is the reverse of the winding angle of an already-applied layer (or tape) onto which the additional layer (or tape) is applied.

A control system CT (see FIG. 15) controls an on-board power generator 262 and motors 264 which provide power to move the gantry system along the pipe 210. Fabric 266 or other material (e.g. tape) on a roll 268 is pulled onto the pipe 210 by the tension created by the rotation of the pipe 210 by the rotators 252.

In one aspect the power generator 262 is a computer-controlled fuelled power generator (e.g. a gasoline engine system or an hydraulically-powered power system, either with suitable connections chains, gears, belts, drives, shafts, and/or gearing for transmitting power). One, two, three or four or more frame rollers are powered to move the system.

The gantry system 260 includes a brake apparatus 261 (which can also provide tension on the fabric 266) and a pivotable frame 263 pivotably mounted on pivots 265 to a main frame 267. The main frame 267 has rollers 269 and power transmission apparatus 272 (e.g. gear system or chain) connected with the motors 264 to move two of the rollers 269 (rollers 269a, 269b). In one aspect, the frame 263 is pivotable within a range between wrap angles of thirty-five to seventy degrees with a setting tolerance of plus or minus two degrees (or, preferably, plus-or-minus one degree) to position the roll 268 and thus the fabric 266 (or tape) at a desired angle with respect to the core pipe.

Optionally a pipe guide 274 connected to the frame 267 contacts and moves along the pipe 210. Optionally the pipe guide 274 has rollers 276. Optionally, one of the motors 264 is deleted.

Optionally, an encoder 278 is provided which is in communication with the control system CT to measure the speed of the gantry system 260 and controls (or the system CT controls) the rotational speed of the rotators 252. This can be done with wires, cables, etc. or wirelessly.

Figure 17:
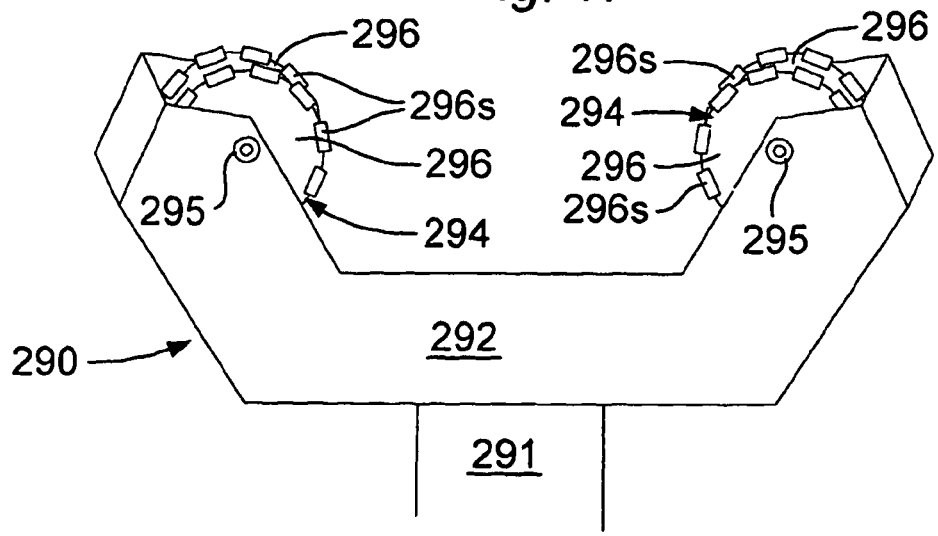
FIG. 17 is a perspective view of a pipe support useful with systems according to the present invention.

FIG. 17 illustrates a pipe support 290 according to the present invention which has a bar 291, a beam 292 and roller apparatuses 294 with rollers 296 rotatably mounted on the beam 292, e.g. with bolt/nut combinations 295. Each roller 296 has multiple sub-rollers 296s rotatably mounted to the rollers 296 Optionally, a power system 294p provides power and power-transmitting apparatus and/or connections to selective rotate the rollers.

Figure 18:
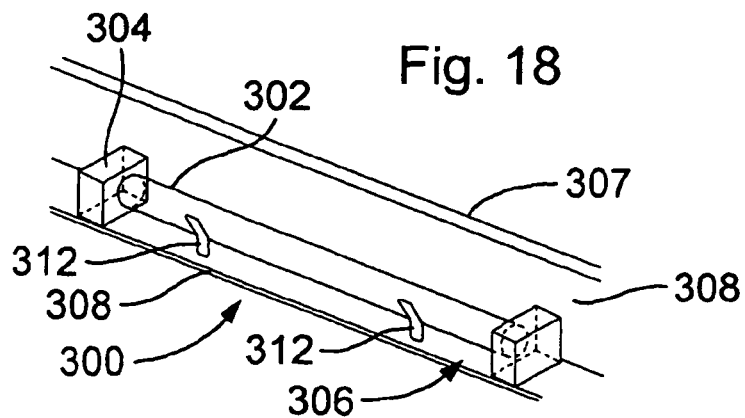
FIG. 18 is a perspective view of a system according to the present invention.

FIG. 18 shows a system 300 according to the present invention for making a pipe for installation in a degraded pipeline. A wrapping machine according to the present invention (e.g. like the wrapping apparatus 202 or the gantry system 260; not shown) wraps material (fabric, tape, etc.) onto a core pipe 302 held and rotated by rotators 304. In one aspect, initially an end of the wrap material is adhered to, glued to and/or taped to the core pipe.

A base 306 beneath the pipe 302 has outer edges 308 which provide a guide for wheels or rollers (e.g. the rollers 269, FIG. 15, abut these edges as the system moves down the pipe) to guide a wrapping machine as it moves along a pipe. Optionally, pipe guides 312 on the base 306 maintain the position of the pipe 302. The guides 312 may have rollers thereon (e.g., any rollers disclosed herein).

Figure 19:
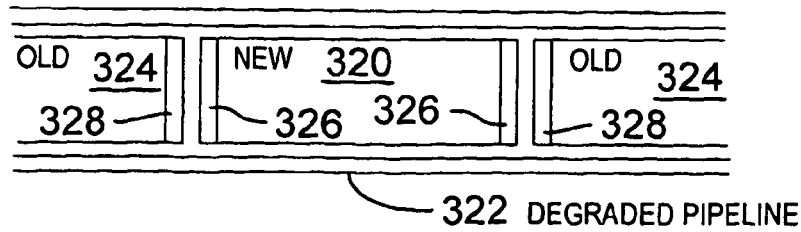
FIG. 19 is a schematic view of installation according to the present invention of a pipe according to the present invention in a degraded pipe line.

FIG. 19 illustrates installation of a pipe 320 according to the present invention within a degraded (rusted, damaged, fallen, severed, punctured, opened, deteriorated, sagging, leaking, etc.) pipeline 322. The pipeline 322 has an inner flow pipe 324 from which a section has been removed. Access to the pipe line interior is established to position the pipe 320 between ends of pipe 324. Connections 326 on the pipe 320 are connected to connections 328 on the pipe 324. The outer pipeline 322 is then sealed, enclosed, and/or welded.

Figure 20:
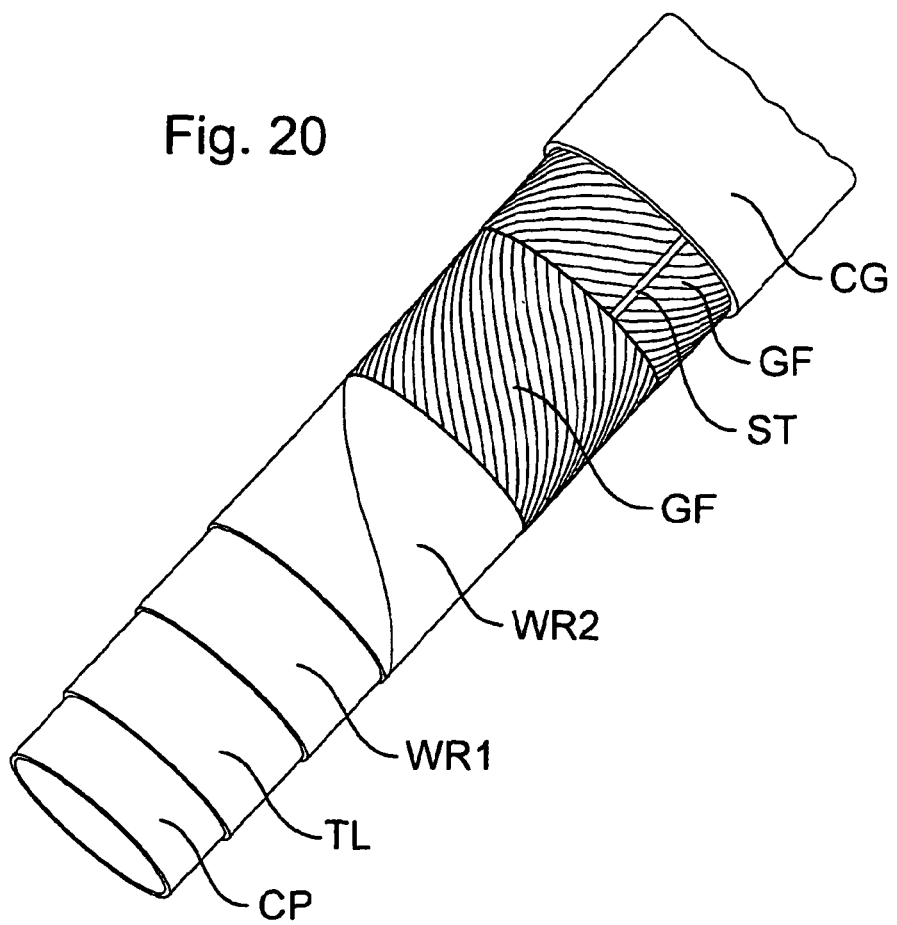
FIG. 20 is a perspective view of a pipe according to the present invention.

FIG. 20 shows a pipe according to the present invention which can be made with apparatus according to the present invention (e.g. as in FIGS. 14, 15) by methods according to the present invention.

Figure 21:
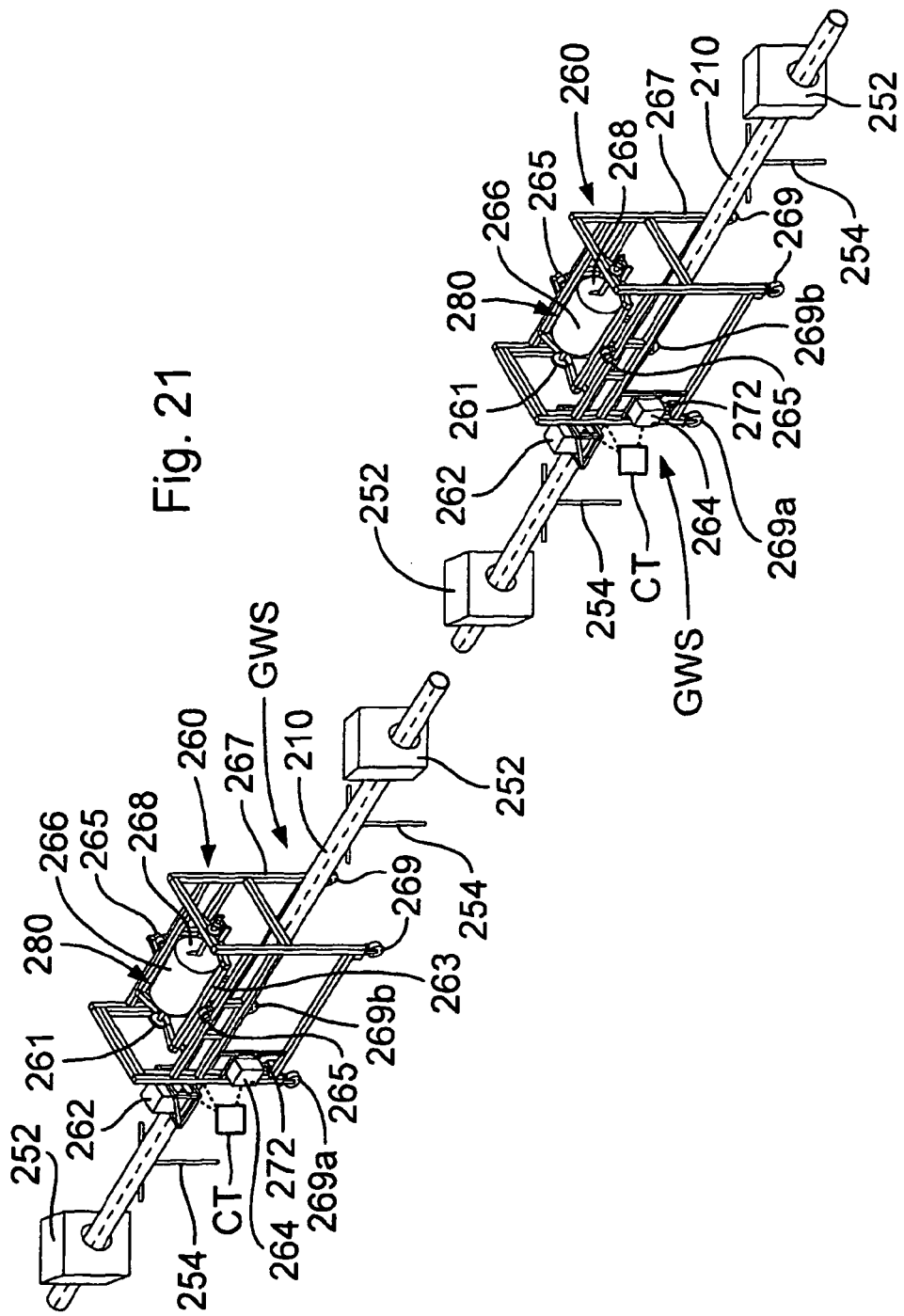
FIG. 21 is a perspective view of a system according to the present invention.

It is within the scope of the present invention to employ multiple wrapping systems according to the present invention side-by-side or end-to-end, each producing a pipe according to the present invention. These multiple pipes are then joined together to produce a pipe of desired length. FIG. 21 shows multiple gantry wrap systems GWS according to the present invention making pipes to be joined end-to-end upon completion.

Figure 15:
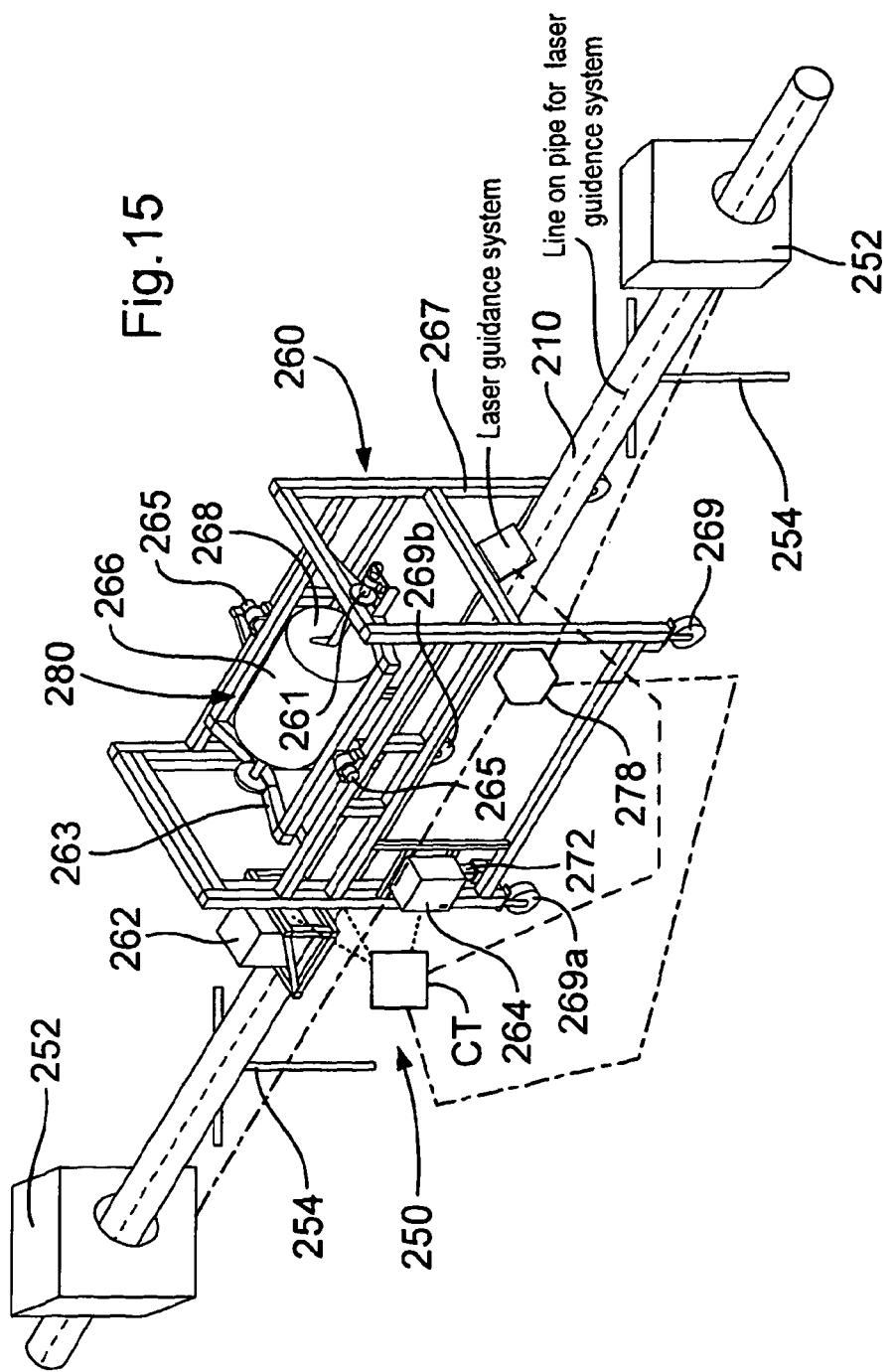
FIG. 15 is a perspective view of a system according to the present invention.
Figure 16A:
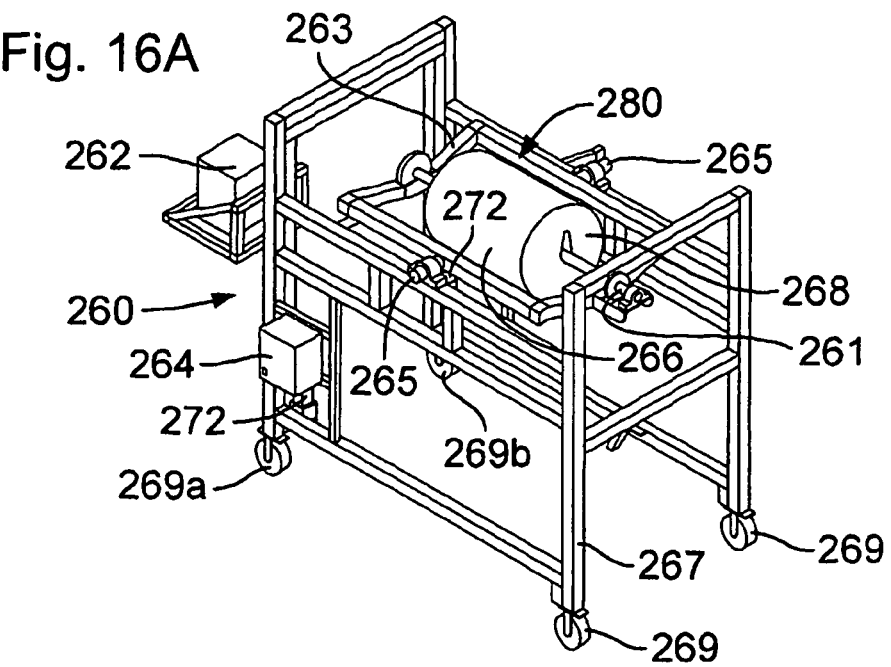
FIG. 16A is a perspective view of a system according to the present invention.
Figure 16B:
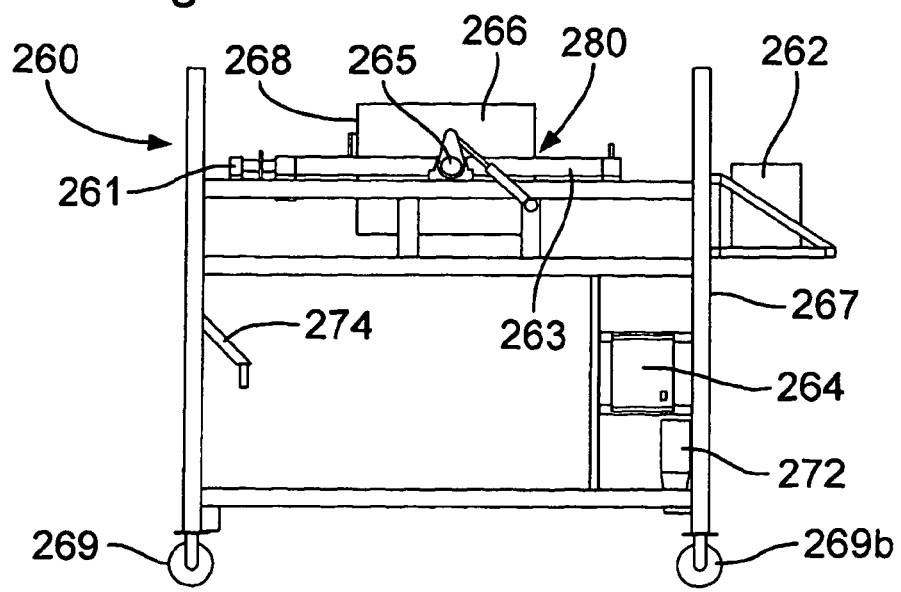
FIG. 16B is a side view of part of the system of FIG. 16A.
Figure 16C:
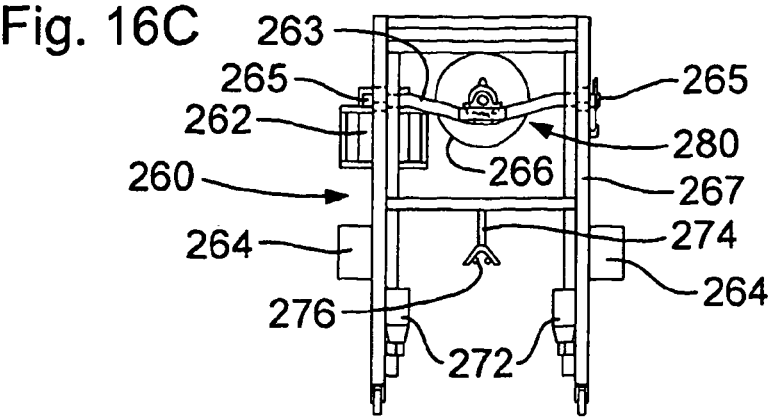
FIG. 16C is an end view of the system of FIG. 16A.
Figure 16D:
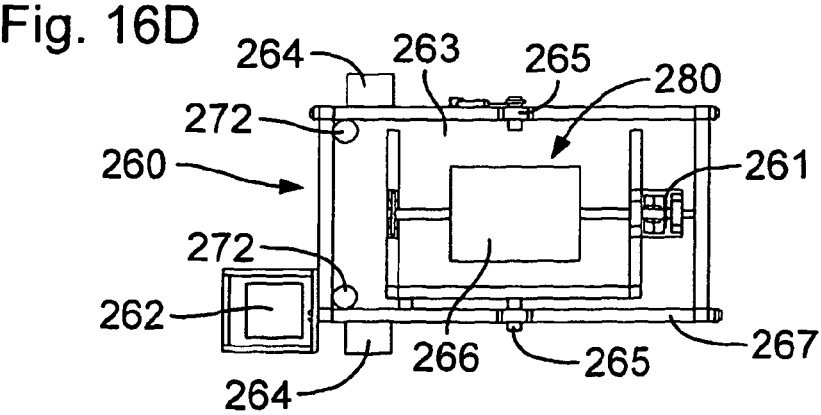
FIG. 16D is a top view of the system of FIG. 16A.
Figure 16E:
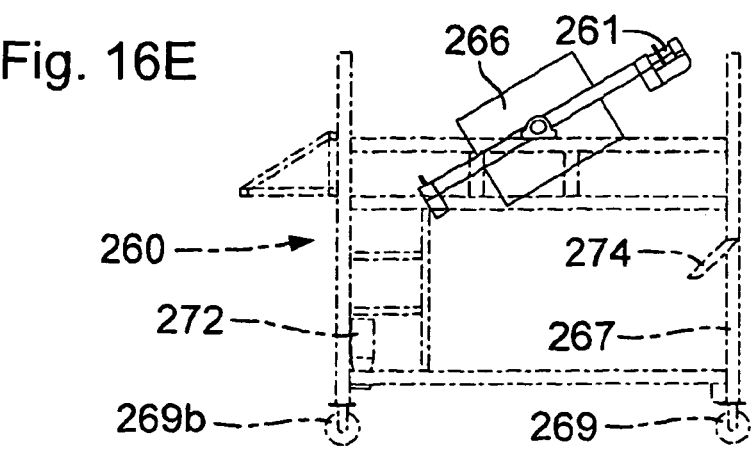
FIG. 16E shows the system of FIG. 16A with a wrapping apparatus filled with respect to a system frame.

A system according to the present invention, e.g. as in FIG. 14 or 15, is used to make finite lengths of pipe for stand along applications (or for pull-in applications that have sufficient clearance to allow pull-in without folding or deformation of the pipe). Multiple passes are made over the finite length of pipe wrapping it with reinforcing fabric, laying axial components if desired, and optionally applying a protective outer covering. Systems according to the present invention may be used to lay fabric on the up stroke only (i.e. going in a first direction) or on the up and back stroke (going in the opposite direction). In one aspect, fabric is laid in one direction then the gantry system's direction is reversed and fabric is laid in the other direction. In another aspect, fabric is laid in one direction and cut and then either fabric is laid in the opposite direction or the system is moved to the original starting point and another layer is laid.

In one aspect a core pipe to be wrapped is made by butt fusion welding (e.g. by known methods, e.g. as in U.S. Pat. No. 7,347,127) with known inspection and bead removal. The ends of the pipe are sealed with aluminum inserts or weld-on HDPE end caps. The pipe is set up horizontally in commercially available weld positioner-rotators positioned at each end of the pipe. The pipe is leveled. Pipe supports and/or guides are positioned along the length (as required) to keep the pipe level and minimize sagging.

In one aspect, the core pipe is pressurized to about 50% of its quick burst pressure using a rotary connector. Optionally, the pipe is maintained under a cover (e.g., see cover 307, FIG. 18, shown schematically) to prevent direct contact with sunlight to prevent heating of the pipe. Guide(s) for the gantry wheels are centered on the pipe.

The wrapping (e.g. gantry) system is driven over the weld positioner/rotator at one end and, when in position just inside the weld positioner/rotator, the pipe is rotated to pull fabric off the roll (see roll 268, FIG. 15) at approximately 90-degrees for one or two wraps. Rotation is then stopped. The fabric is secured to the pipe with pieces of tape and/or with multiple (two or three as needed) clamps such as hose clamps. The orientation of the roll of fabric is manually changed to provide a desired wrap angle (e.g. plus-or-minus 55 degrees), and rotation of the pipe in the proper direction and at the proper speed begins simultaneously as the gantry system moves along the pipe.

The rotation of the pipe pulls fabric off of the roll against the resistance of the roll/brake to lay the fabric under tension on the pipe. As fabric wrapping occurs, the gantry system is travelling toward the second weld positioner at a controlled speed controlled by a control system (e.g. system CS or CT) to match the rotating speed and produce the wrap angle. As it reaches the end of the pipe, gantry system translation is stopped and rotation continues to lay one/two wraps of about 90-degree fabric, then rotation is stopped and the fabric is secured with clamps. In certain aspects the gantry system has hard wheels, hard rollers, inflatable tires, or flotation type tires.

In one aspect, the fabric comes off the pipe at about midpoint above where the guide rollers make contact. The rollers go over fabric already laid.

The fabric is cut or turned and the roll angle adjusted to a co-helical position and the gantry system reverses direction to lay a next layer of fabric. The process is repeated until the desired number of layers and/or pairs of fabric are laid. Optionally, when the fabric is cut, the gantry system returns to the starting point, the angle is adjusted and a second layer is applied co-helically.

Optionally axial pulling tapes are applied by the gantry system. If optical fibers are to be used they are loaded on the gantry system and laid down. Rollers may be used to guide optical fibers.

In one aspect, the fabric on the roll is replaced with a spool (or spools) of TEK-RAP (or equivalent) and a protective outer layer is applied. Optionally, seams of the TEK-RAP are orientated so that there is no edge to catch. The angle of wrapping of the outer layer may be different from the reinforcement layers. In one aspect, if axial components are applied, once they are in place, such a protective layer is applied.

In one aspect a system according to the present invention (e.g., as in FIG. 14 or a gantry system 260) is used to make pipe in relatively short lengths (e.g. about 121.9 m (400 feet); about 121.9 m (400 feet) that is then cut down to about 114.3 m (375 feet); e.g. 0 to 914.4 m (0 to 3,000 feet) in length). In one aspect using a system according to the present invention in a method according to the present invention, one wrapping pass is made down a length of rotating core pipe and at an end the fabric is secured. Optionally, the direction of the system is reversed and the angle of the roll is adjusted. The fabric (or tape) is secured and the system returns to a starting point to make another pass with the angle of the roll changed. In one aspect, a number of pairs of fabric are laid and secured in individual passes.

In one particular aspect of the present invention, a pipe line is restored by installing in it a pipe made as follows:

1. HDPE core pipe CP, butt fusion welded (using a machine according to the present invention or a system according to the present invention) is made.

2. High Strength braided fabric sleeve, Wrap 1 (WR 1), is wrapped on the core pipe, CP.

3. High Strength braided fabric sleeve, Wrap 2 (WR 2), is wrapped on the core pipe.

4. Fiber optic sensors ST are secured to the pipe (optional).

5. Protective outer wrap CG (e.g. HDPE film) wrapped on pipe.

Optionally, one, two or more layers of strengthening material GF, e.g. glass fiber material, is applied over Wrap 2. Optionally, a tape layer TL is wrapped around the core pipe to inhibit or prevent the diffusion of gases through the core pipe CP. In one aspect the layer TL is a foil layer. In one particular aspect, the layer TL is aluminium foil tape, e.g., but not limited to, commercially available 3M Aluminium Foil Tape 1450.

HDPE core pipe sections are brought together in line and butt fusion welded end-to-end, e.g. using a fusion welding machine, e.g. a commercially available TracStar fusion machine provided by McElroy Mfg. Inc. (Tulsa, Okla.). This is followed by welding inspection to verify that a leak-proof seal exists between core pipe components. Fabric material and/or sleeve material, e.g. in one aspect, SPECTRA (TRADEMARK) material braided sleeve and, in another aspect, high strength synthetic fiber material braided sleeve is used for Wraps 1 and 2. Two layers of a high strength braided fabric material is co-helical wrapped around the pipe and controlled by a control systems, e.g., a system with one or more computers and/or PLC's. Any desirable wind angle may be used for Wraps 1 and 2; and, in one particular aspect, positive and negative wind angles (in one aspect, plus-or-minus 65 degrees) are used. Wraps 1 and 2 may be of known fabric material; e.g. of VECTRAN (TRADEMARK) material which has no creep or very low creep) is made from liquid crystal polymer material run through a known fiber spinning process and supplied by Kuraray USA and braided by A&P Technology which provides a commercially available basket woven fabric made of this material. SPECTRA (TRADE- MARK) material is made from ultrahigh molecular weight polyethylene run through a patented gel-spinning process, supplied by Honeywell Advanced Fibers and Composites (Colonial Heights, Va.). Hexcel (Dublin, Calif.) provides a commercially available basket-woven fabric made of this material. In one aspect, as used in methods according to the present invention, a coating is added to the woven fabric— e.g. in one aspect the commercially available EVA coating applied by JHRG LLC (Spring Hope, N.C.) and, in another aspect, a hot melt thermoplastic coating added to the fabric— to prevent unravelling and slipping, before it's finally wound around the pipe.

In one aspect the VECTRAN (TRADEMARK) material or the SPECTRA (TRADEMARK) material is used in its dry form only without the addition of a resin which does not increase the stiffness of the pipe. Any other suitable wrap material can be used for Wraps 1 and 2; e.g. SPECTRA (TRADEMARK) material hybridized with materials that do not creep or a triaxial braided wrap material with unidirectional VECTRAN (TRADEMARK) or S-Glass and hot melt thermoplastic fibers, e.g. as commercially available from A&P Technologies.

Fiber optic sensors are, optionally, applied along the length of the core pipe as strips ST (see FIG. 20) of encapsulated fiber optic sensors, optionally running the entire length of the liner. It is these sensors that provide signals indicative of applied tension which are processed by the control system to provide monitoring of the pipe as it is made. The fiber optic sensors also function during and after core pipe installation in a host pipe: During liner pulling (installation of core pipe) these sensors provide data on pipe tension and integrate with the pipe-pulling system, controlled by the control system, to adjust on-the-fly to increased and decreased tension. After installation, the sensors can (within a limited distance; e.g. in one aspect, within 3.1 feet) detect leaks, sense displacement and/or report temperature along the pipe, all of which help a pipeline manager monitor pipe integrity and anticipate potential failures.

A casing CG (see FIG. 20), e.g. a thin sleeve of thermoplastic film or HDPE film is wrapped around the core pipe CP and the layers on it. In one aspect, this casing CG has a thermoplastic film carrier and a partially cured butyl rubber adhesive backing. In one aspect, this casing CG has an HDPE carrier and a partially cured butyl rubber adhesive. It protects the core pipe CP and its layers during installation in a host pipe or pipeline. In one aspect, this sleeve material is commercially available TER-RAP (trademark) material from Tek-Rap Inc. (Houston, Tex.).

The present invention, therefore, provides in some, but not necessarily all embodiments, a pipe ("core pipe") which is suitable for insertion into a host pipe, the core pipe having: a pipe made of temperature-resistant corrosion-resistant material, the pipe having an outer surface, an inner surface, a first end and a second end and a flow channel therethrough from the first end to the second end; an optional foil tape wrap around the core pipe; a first strengthening wrap around the pipe; an optional second strengthening wrap around the pipe; and a protective outer wrap.

The present invention, therefore, provides methods for restoring a degraded pipeline, the methods including: removing a degraded part of an inner flow pipe of a pipeline leaving a space between two spaced-apart sections of the inner flow pipe; positioning a new pipe in the space; connecting the new pipe to the two spaced-apart sections of the inner flow pipe thereby re-establishing a flow channel through the inner flow pipe; the new pipe having a core pipe with a first strengthening wrap thereon, optionally, a second strengthening wrap around the first strengthening wrap; and a protective outer wrap on the outermost strengthening wrap.

The present invention provides, therefore, in at least certain embodiments, methods for restoring a degraded pipeline, the methods including: removing a degraded part of an inner flow pipe of a pipeline leaving a space between two spaced-apart sections of the inner flow pipe; positioning a new pipe in the space; connecting the new pipe to the two spaced-apart sections of the inner flow pipe thereby re-establishing a flow channel through the inner flow pipe; the new pipe having a core pipe wrapped by a wrapping system according to the present invention as any disclosed herein.

The present invention, therefore, provides, in at least certain embodiments, a core pipe wrapped with one or a plurality of layers with wrapping material applied from a wrapping system according to the present invention. Such a core pipe may have one or some, in any possible combination, of the following: the pipe is of a continuous length produced in-situ at a site of a degraded pipeline; the wrapping material is one of high strength material, fabric and tape; the wrapping material includes multiple layers of fabric and at least one layer of tape; the wrapping material includes at least one layer of fabric and an outer protective layer; the outer protective layer is adhesive backed thermoplastic tape; axial strength members on a layer on the core pipe; the axial strength members are unidirectional tapes made of synthetic fibers; the wrapping material is fabric material made of high strength synthetic fibers; a protective outer wrap on the core pipe for protection during installation of the pipe in a degraded pipeline.

The present invention, therefore, provides in at least certain embodiments, methods for making a pipe suitable for installation into a degraded pipeline, the methods including: using a wrapping system; wrapping a core pipe with at least one layer of wrapping material; the wrapping system movable adjacent the core pipe as the core pipe is rotated with respect to the wrapping system (e.g., but not limited to, core pipe beneath the wrapping system); the wrapping material dispensed from a roll on a frame of the wrapping system at a desired wrap angle.

The present invention, therefore, provides, in at least certain embodiments, a system for making a pipe suitable for installation into a degraded pipeline, the system having: a frame; a roll of wrapping material, the roll pivotably mounted to the frame; and movement apparatus on the frame for moving the frame with respect to a core pipe to be wrapped to form pipe to be installed in a degraded pipeline.

The invention claimed is:
1. A method for restoring a degraded pipeline,
the method comprising:
removing a degraded part of an inner flow pipe of a pipeline leaving a space between two spaced-apart sections of the inner flow pipe;
making a new pipe using a wrapping system for wrapping a core pipe, the wrapping system on a frame, the frame movable adjacent the core pipe without connection to the core pipe, the wrapping system located on the frame so that the wrapping system is entirely above the core pipe with the core pipe entirely outside of the wrapping system and beneath the wrapping system,
the wrapping system comprising a stand-alone system unconnected to the core pipe, the frame having a plurality of rollers for facilitating movement of the frame with respect to the core pipe, the wrapping system including a roll of wrapping material on the frame above the core pipe;

the frame including rollers powered by at least one motor, the at least one motor on the frame, the frame having an on-board power generator for providing power to the at least one motor to power the rollers to move the frame, moving the frame along the core pipe by powering the rollers with the at least one motor, the at least one motor powered by the power generator, the core pipe extending through the frame as the frame moves;

rotating the core pipe beneath the wrapping system as the frame moves with the wrapping system above the core pipe so that rotation of the core pipe pulls material off the roll of wrapping material onto the core pipe;

dispensing wrapping material from the roll of wrapping material on the frame down onto the core pipe at a desired wrap angle producing the new pipe;

positioning the new pipe in the space; and connecting the new pipe to the two spaced-apart sections of the inner flow pipe thereby re-establishing a flow channel through the inner flow pipe.

2. The method of claim 1 further comprising the wrapping system including a pipe guide connected to the frame, and the pipe guide with rollers contacting and movable on the top of the core pipe to guide the frame in movement along the core pipe, the method further comprising guiding the frame's movement with respect to the core pipe using the pipe guide.

3. The method of claim 1, wherein the wrapping material includes multiple layers of fabric and at least one layer of tape, and wherein the movement of the frame is unconstrained by rail or track structure constraining movement of the rollers.

4. The method of claim 1, wherein the wrapping material includes at least one layer of fabric and an outer protective layer.

5. The method of claim 1 wherein the wrapping material is fabric material made of high strength synthetic fibers.

6. The method of claim 1, wherein the wrapping system is movable above the core pipe as the core pipe is rotated.

7. The method of claim 1 the new pipe has the core pipe with a first strengthening wrap thereon, a second strengthening wrap around the first strengthening wrap, and a protective outer wrap on the second strengthening wrap.

8. A system for making a pipe suitable for installation into a degraded pipeline, the system comprising:

a stand-alone frame;

rollers on the frame for facilitating movement of the frame with respect to a core pipe extending through the frame;

the rollers comprising powered rollers, a power generator on the frame, and at least one motor for powering rollers on the frame, the power generator providing power to the at least one motor;

a roll of wrapping material on the frame, the roll pivotably mounted to the frame for positioning above the core pipe, the roll pivotable so that wrapping of material is at a desired wrapping angle;

movement apparatus on the frame for moving the frame with respect to the core pipe, the core pipe extending through the frame entirely outside the roll of wrapping material and beneath the roll of wrapping material, the wrapping material to be wrapped down onto the core pipe to form the pipe suitable for installation in a degraded pipeline; and the frame movable along the core pipe without connection to the core pipe.

9. The system of claim 8 further comprising a pipe guide connected to the frame and the pipe guide having rollers movable on the top of the core pipe to guide the frame in movement along the core pipe.

10. The system of claim 8, wherein the system includes rotation apparatus for rotating the core pipe so that rotation of the core pipe pulls material off the roll of wrapping material onto the core pipe.

11. The system of claim 8, wherein the frame has a plurality of rollers and is movable on said plurality, and the at least one motor is a plurality of motors for powering said rollers.

12. The system of claim 8, further comprising a brake apparatus on the frame for braking the system during movement.

13. The system of claim 8, further comprising a laser guidance system for guiding the system during wrapping.

14. A pipe comprising a core pipe wrapped with one or a plurality of layers with wrapping material applied from a system, the system comprising a stand-alone frame;

rollers on the frame for facilitating movement of the frame with respect to a core pipe extending through the frame;

a roll of wrapping material on the frame, the roll pivotably mounted to the frame for positioning above the core pipe, the roll entirely above the core pipe and the core pipe entirely outside the roll, the roll pivotable so that wrapping of material is at a desired wrapping angle;

movement apparatus on the frame for moving the frame with respect to the core pipe extending through the frame beneath the roll of wrapping material, the movement apparatus including a power generator on the frame, at least one motor on the frame powered by the power generator, the at least one motor powering rollers on the frame to move the frame, the wrapping material to be wrapped down onto the core pipe to form the pipe suitable for installation in a degraded pipeline;

the frame movable along the core pipe without connection to the core pipe; and the pipe a continuous length produced in-situ at a site of a degraded pipeline.

15. The pipe of claim 14 wherein the system further comprises a pipe guide connected to the frame and with rollers movable on the top of the core pipe to guide the frame in movement along the core pipe.

16. The pipe of claim 14, wherein the wrapping material is one of high strength material, synthetic fibers for reinforcement and hoop strength, fabric and tape.

17. The pipe of claim 14, wherein the wrapping material includes multiple layers of fabric and at least one layer of tape, and wherein the wrapping material includes an outer protective layer.

18. The pipe of claim 14, the pipe further comprising axial strength members on a layer on the core pipe.

19. The pipe of claim 14, further comprising at least one fiber optic cable and a protective outer wrap on core pipe and covering the at least one fiber optic cable for protection during installation of the pipe in a degraded pipeline.

20. The pipe of claim 14 wherein the system includes rotation apparatus for rotating the core pipe so that rotation of the core pipe pulls material off the roll of wrapping material onto the core pipe.

* * * * *